US012482391B2

(12) United States Patent
Xu et al.

(10) Patent No.: US 12,482,391 B2
(45) Date of Patent: Nov. 25, 2025

(54) DISPLAY METHOD AND APPARATUS FOR REDUCING FRAME LOSS DURING REFRESH RATE SWITCHING

(71) Applicant: HONOR DEVICE CO., LTD., Shenzhen (CN)

(72) Inventors: Tao Xu, Shenzhen (CN); Lifeng Cai, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/851,617

(22) PCT Filed: Sep. 1, 2023

(86) PCT No.: PCT/CN2023/116602

§ 371 (c)(1),
(2) Date: Sep. 26, 2024

(87) PCT Pub. No.: WO2024/066926

PCT Pub. Date: Apr. 4, 2024

(65) Prior Publication Data

US 2025/0201160 A1 Jun. 19, 2025

(30) Foreign Application Priority Data

Sep. 30, 2022 (CN) ........................ 202211230396.X

(51) Int. Cl.
*G09G 3/30* (2006.01)
*G09G 3/20* (2006.01)
*G09G 3/36* (2006.01)

(52) U.S. Cl.
CPC ....... *G09G 3/20* (2013.01); *G09G 2340/0435* (2013.01)

(58) Field of Classification Search
CPC ......................... G09G 3/20; G09G 2340/0435
See application file for complete search history.

(56) References Cited

U.S. PATENT DOCUMENTS

2014/0092150 A1* 4/2014 Slavenburg ............ G09G 5/001 345/698
2018/0121213 A1* 5/2018 Koo ......................... G09G 5/14
(Continued)

FOREIGN PATENT DOCUMENTS

CN 109104638 A 12/2018
CN 110933315 A 3/2020
(Continued)

*Primary Examiner* — Sanghyuk Park
(74) *Attorney, Agent, or Firm* — WOMBLE BOND DICKINSON (US) LLP

(57) ABSTRACT

This application provides a display method and an apparatus. The display method includes: determining that a refresh rate of an electronic device is switched from a first refresh rate to a second refresh rate, where the first refresh rate is greater than the second refresh rate; generating, in a case that the refresh rate is switched from the first refresh rate to the second refresh rate, a second image frame after the electronic device completes display of a first image frame; and displaying the second image frame. An objective is to resolve a frame loss problem caused by switching from a high refresh rate to a low refresh rate, to reduce lag in the electronic device, and improve user experience.

19 Claims, 15 Drawing Sheets

(56) References Cited

U.S. PATENT DOCUMENTS

| | | | | |
|---|---|---|---|---|
| 2018/0262815 | A1 | 9/2018 | Wang | |
| 2022/0310001 | A1* | 9/2022 | Youn | G09G 5/10 |
| 2023/0410732 | A1* | 12/2023 | Chou | G06F 3/14 |
| 2024/0021176 | A1 | 1/2024 | Chen et al. | |
| 2024/0185775 | A1 | 6/2024 | Zhang et al. | |

FOREIGN PATENT DOCUMENTS

| | | | |
|---|---|---|---|
| CN | 112256219 | A | 1/2021 |
| CN | 113625986 | A | 11/2021 |
| CN | 114338952 | A | 4/2022 |
| CN | 114579076 | A | 6/2022 |
| CN | 114648951 | A | 6/2022 |
| WO | 2019242488 | A1 | 12/2019 |

* cited by examiner

DISPLAY METHOD AND APPARATUS FOR REDUCING FRAME LOSS DURING REFRESH RATE SWITCHING

CROSS-REFERENCE TO RELATED APPLICATIONS

This application is a national stage of International Application No. PCT/CN2023/116602, filed on Sep. 1, 2023, which claims priority to Chinese Patent Application No. 202211230396.X, filed on Sep. 30, 2022, both of which are incorporated herein by reference in their entireties.

TECHNICAL FIELD

This application relates to the field of image processing technologies, and in particular, to a display method and an apparatus.

BACKGROUND

An electronic device may have a plurality of applications (APPs) installed thereon, and control, during running of an APP, display of an image frame at a refresh rate corresponding to the APP. Some of the plurality of APPs have different refresh rates. When the electronic device switches the APP, the refresh rate is also synchronously switched. However, when the electronic device switches from a high refresh rate to a low refresh rate, a frame loss problem occurs. As a result, apparent lag occurs in the electronic device, and user experience is reduced.

SUMMARY

This application provides a display method and an apparatus, and an objective is to resolve a frame loss problem caused by switching from a high refresh rate to a low refresh rate, to reduce lag in an electronic device, and improve user experience. To achieve the foregoing objective, this application provides the following technical solutions.

According to a first aspect, this application provides a display method, applied to an electronic device, where the method includes: determining that a refresh rate of the electronic device is switched from a first refresh rate to a second refresh rate, where the first refresh rate is greater than the second refresh rate; generating, in a case that the refresh rate is switched from the first refresh rate to the second refresh rate, a second image frame after the electronic device completes display of a first image frame; and displaying the second image frame.

Generally, when the electronic device generates one image frame, two conditions need to be met: One condition is that a level change of a first signal (that is, Vsync-sf) meets a preset condition, where the preset condition is that a level of the first signal changes from a low level to a high level (corresponding to a rising edge), or the level of the first signal changes from the high level to the low level (corresponding to a falling edge); and the other condition is that the electronic device completes display of a previous image frame. However, when the electronic device switches from the first refresh rate to the second refresh rate, time consumption of a second signal (that is, Vsync-hw) increases (that is, a periodicity increases). The second signal with the increased time consumption may cover at least one first signal, and under the covered first signal, the electronic device cannot determine whether display of the image frame is completed, making the electronic device unable to process another image frame, and resulting in an image frame loss. At an end position of the second signal, the electronic device may determine that display of the image frame is completed, but the electronic device still needs to wait for a rising edge or a falling edge of the first signal, which may also cause the electronic device to lose the image frame during waiting. However, according to the display method provided in this application, after it is determined that the refresh rate is switched from the first refresh rate to the second refresh rate, and after the electronic device completes display of the first image frame, the electronic device may immediately generate and display the second image frame. In this way, after determining that display of the image frame is completed, the electronic device may immediately generate and display another image frame without waiting for the rising edge or the falling edge of the first signal, to reduce the image frame loss, thereby reducing lag in the electronic device, and improving user experience.

Optionally, the method further includes: controlling, after the refresh rate is switched to the second refresh rate, a first signal to be aligned with a second signal, where the first signal indicates to generate an image frame, and the second signal indicates to display the image frame; generating a third image frame when the electronic device completes display of the second image frame and a level change of the first signal meets a preset condition, where the preset condition is that a level of the first signal changes from a low level to a high level, or the level of the first signal changes from the high level to the low level; and displaying the third image frame under action of the second signal. Alignment means that periodicities of the first signal and the second signal are the same, rising edges of the first signal and the second signal are aligned, and falling edges of the first signal and the second signal are also aligned. In other words, waveforms of the first signal and the second signal are the same, where signal amplitude may be the same or different.

Generally, in a process in which the refresh rate is switched to the second refresh rate, a periodicity of the second signal generated by the electronic device increases, making the first signal and the second signal that can be aligned before switching unable to remain aligned after the refresh rate is switched. In this case, the image frame may be generated once every other first signal, resulting in alternate occurrence of synthesizing one frame and losing one frame in the electronic device. The synthesizing one frame may be generating one image frame, to further display the image frame. However, according to the display method provided in this application, the electronic device can control the first signal to be aligned with the second signal after the refresh rate is switched. In this way, the electronic device can generate one image frame at each first signal, to avoid alternate occurrence of synthesizing one frame and losing one frame, and reduce the image frame loss, thereby reducing lag in the electronic device, and improving user experience.

Optionally, before the determining that a refresh rate of the electronic device is switched from a first refresh rate to a second refresh rate, the method further includes: generating, in a case that the refresh rate is the first refresh rate, an $(i+n)^{th}$ first signal based on an $i^{th}$ second signal, where an interval between the $(i+n)^{th}$ first signal and the $i^{th}$ second signal is a sum of periodicities of n first signals, and n is a natural number greater than 1; and the controlling, after the refresh rate is switched to the second refresh rate, a first signal to be aligned with a second signal includes: sampling, after the refresh rate is switched to the second refresh rate, a $1^{st}$ second signal after the refresh rate is switched, and generating the first signal by using a sampling result of the 1st second signal, where an interval between the first signal and the 1st second signal is a sum of periodicities of (n−1) second signals. After the refresh rate is switched, the reason why the first signal is not aligned with the second signal is the second signal with the increased periodicity is used during generation of the first signal. Therefore, in this application, after determining that the refresh rate is switched, the electronic device adjusts a generation mechanism of the first signal after switching, and generates the first signal by using the 1st second signal after the refresh rate is switched, so that the first signal and the second signal can be aligned after the refresh rate is switched. The sampling result of the second signal may be stored in a result sequence, and during generation of the first signal, the sampling result of the second signal is read from the result sequence. The sampling result of the second signal may be a plurality of timestamps of the second signal, and the result sequence may be a timestamp sequence storing the plurality of timestamps of the second signal.

Optionally, the method further includes: discarding a special signal, where the special signal is the second signal generated in a process in which the refresh rate is switched from the first refresh rate to the second refresh rate, and the special signal is a previous signal of the 1st second signal, to reduce a data volume processed by the electronic device.

Optionally, the discarding a special signal includes: prohibiting sampling the special signal; or sampling the special signal, where a sampling result of the special signal is not stored in a result sequence.

Optionally, the second image frame is an image frame lost in the process in which the refresh rate is switched from the first refresh rate to the second refresh rate. In some examples, after determining that display of the first image frame is completed, the electronic device may immediately generate a first image frame in a plurality of lost image frames, to ensure continuity of images. In some examples, after determining that display of the first image frame is completed, the electronic device may immediately synthesize a last image frame in the plurality of lost image frames, to shorten a delay of the last image frame, and when an image frame displayed next time by the electronic device is a next image frame of the lost last image frame, the electronic device immediately generates and displays the lost last image frame, so that the image frame displayed next time and the lost last image frame are continuous, to ensure continuity.

Optionally, that the electronic device completes display of a first image frame includes: determining that the electronic device completes display of the first image frame after the electronic device invokes a kernel thread crtc_commit to release a fence resource.

Optionally, the determining that a refresh rate of the electronic device is switched from a first refresh rate to a second refresh rate includes: determining end time of the first signal and start time of the first signal when the refresh rate of the electronic device is the first refresh rate; determining a difference between the end time and the start time; and determining that the refresh rate of the electronic device is switched from the first refresh rate to the second refresh rate if the difference meets a preset switching condition. The preset switching condition may indicate that a periodicity of the first signal increases, for example, the preset switching condition may be a preset threshold or a preset value range, and the preset threshold and the preset value range are determined based on the refresh rate. For example, when the refresh rate is switched from 90 Hz to 60 Hz, the preset threshold may be a value less than 19.4 ms, and the preset value range may be (11.1, 19.4].

Optionally, an application framework layer of the electronic device includes a refresh rate processing unit and a data reading unit; a hardware abstraction layer of the electronic device includes a hardware composer; and a kernel layer of the electronic device includes a display driver, where the refresh rate processing unit is configured to determine that the refresh rate of the electronic device is switched from the first refresh rate to the second refresh rate; the data reading unit is configured to read, in a case that the refresh rate is switched from the first refresh rate to the second refresh rate, first image data after the electronic device completes display of the first image frame; the hardware composer is configured to synthesize the first image data, to generate the second image frame; and the display driver is configured to display the second image frame.

Optionally, the application framework layer of the electronic device further includes: a signal generation unit, where the signal generation unit is configured to control, after the refresh rate is switched to the second refresh rate, the first signal to be aligned with the second signal, where the first signal indicates to generate the image frame, and the second signal indicates to display the image frame; the data reading unit is further configured to read second image data when the electronic device completes display of the second image frame and the level change of the first signal meets the preset condition, where the preset condition is that the level of the first signal changes from the low level to the high level, or the level of the first signal changes from the high level to the low level; the hardware composer is further configured to synthesize the second image data, to generate the third image frame; and the display driver is further configured to display the third image frame under the action of the second signal.

According to a second aspect, this application provides an electronic device, where the electronic device includes: one or more processors; and one or more memories, where the memory stores one or more programs, and the one or more programs, when executed by the processor, enable the electronic device to perform the foregoing display method.

According to a third aspect, this application provides a computer-readable storage medium, where the computer-readable storage medium stores a computer program, and the computer program, when executed by a processor, enables the processor to perform the foregoing display method.

In this application, based on implementations according to the foregoing aspects, further combinations may be performed, to provide more implementations.

DESCRIPTION OF EMBODIMENTS

Figure 1:
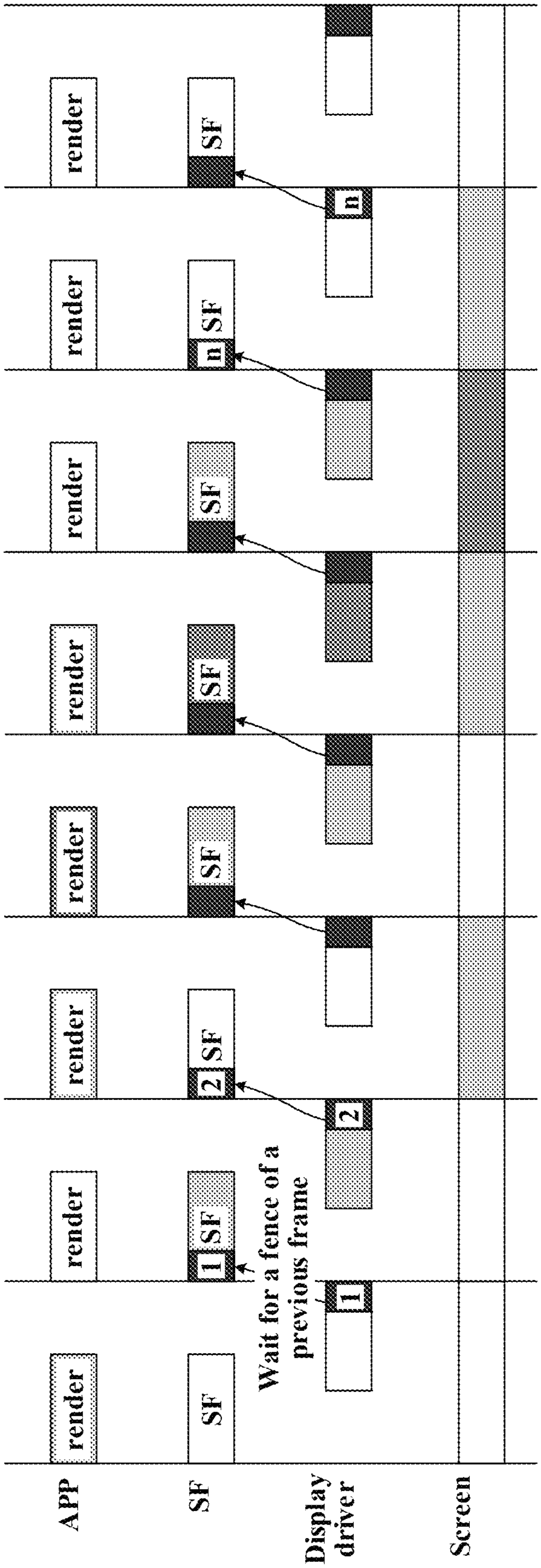
FIG. 1 is a schematic diagram of performing rendering to displaying of an image frame by using Vsync-app, Vsync-sf, and Vsync-hw according to an embodiment of this application.

The following clearly and describes the technical solutions in embodiments of this application with reference to the accompanying drawings in embodiments of this application. Terms used in the following embodiments are merely intended to describe objectives of particular embodiments, but are not intended to limit this application. As used in this specification and the claims of this application, a singular expression form, "one", "a", "the", "foregoing", "the", or "this", is intended to also include "one or more" expression form, unless clearly indicated to the contrary in the context. It should be further understood that, in embodiments of this application, "one or more" means one, two, or more than two; and "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects.

Reference to "one embodiment", "some embodiments", or the like described in this specification means that a specific feature, structure, or characteristic described with reference to this embodiment is included in one or more embodiments of this application. Therefore, statements such as "in one embodiment", "in some embodiments", "in some other embodiments" that appear in different parts of this application do not necessarily refer to same embodiments, but mean "one or more but not all embodiments", unless otherwise specifically emphasized in other manners. The terms "comprise", "include", "have", and variants thereof all mean "include but are not limited to", unless otherwise specifically emphasized in another manner.

"Plurality of" in embodiments of this application means greater than or equal to two. It should be noted that, in descriptions of embodiments of this application, terms such as "first" and "second" are merely for distinguishing descriptions, and cannot be understood as an indication or implication of relative importance, or an indication or implication of a sequence.

First, technical terms involved in this application are described as follows.

A vertical synchronization (Vsync) signal is divided into a hardware Vsync signal and a software Vsync signal. The hardware Vsync signal is abbreviated as Vsync-hw signal, which can be understood as a tearing effect (TE) signal. The software Vsync signal includes a Vsync-app signal and a Vsync-sf signal. For convenience of description, the Vsync-hw signal, the Vsync-app signal, and the Vsync-sf signal are abbreviated as Vsync-hw, Vsync-app, and Vsync-sf.

The Vsync-app and the Vsync-sf are generated based on the Vsync-hw. Specifically, DispSyncSource.cpp in SF (surfaceflinger) virtualizes the Vsync-hw into the Vsync-app and the Vsync-sf, where DispSyncSource.cpp samples the Vsync-hw, and inputs a sampling result into a software Vsync model; and DispSyncSource.cpp runs the software Vsync model, to output the Vsync-app and the Vsync-sf through the software Vsync model. The Vsync-hw may be generated by a display driver based on a refresh rate.

A process in which an electronic device performs rendering to displaying of an image frame by using the Vsync-app, the Vsync-sf, and the Vsync-hw is shown in FIG. 1. Under action of the Vsync-app, an APP generates image data (where such a process is an APP rendering process, and render in FIG. 1 indicates the image data), and stores the image data in a buffer (buffer). Under action of the Vsync-sf, SF reads the image data from the buffer, and sends the image data to a hardware composer (HWC), where the image data is synthesized by HWC, to generate an image frame (where such a process is referred to as SF synthesis). HWC sends the image frame to the display driver, and the display driver sends the image frame to a screen for display under action of the Vsync-hw (where such a process is referred to as HWC sending and display). After the screen completes display of the image frame, the display driver invokes a kernel thread crtc_commit, and crtc_commit releases a fence resource, where that the fence resource is released may indicate that the electronic device completes display of the image frame.

However, display of the image frame is not completely independent of a previous image frame. After display of the previous image frame is completed and crtc_commit releases the fence resource, SF may read image data of a next image frame under the action of the Vsync-sf, and then complete display of the next image frame through HWC and the display driver. In FIG. 1, the image frame undergoes three periodicities from rendering to display. In the three periodicities, APP rendering is completed in a first periodicity, SF synthesis is completed in a second periodicity, and HWC sending and display is completed in a third periodicity.

Periodicities of the Vsync-app, the Vsync-sf, and the Vsync-hw may be determined based on a refresh rate corresponding to the APP. For example, if the refresh rate corresponding to the APP is 90 Hz, the periodicities of the Vsync-app, the Vsync-sf, and the Vsync-hw are 11.1 milliseconds (ms); and if the refresh rate corresponding to the APP is 60 Hz, the periodicities of the Vsync-app, the Vsync-sf, and the Vsync-hw are 16.6 ms. When the electronic device switches the APP, the refresh rate is also synchronously switched. However, when the electronic device switches from a high refresh rate to a low refresh rate, the periodicity of the Vsync-hw is too long, resulting in a frame loss problem in the APP switching process. In addition, after switching is completed, the Vsync-app, the Vsync-sf, and the Vsync-hw are not aligned, resulting in alternate occurrence of synthesizing one frame and losing one frame after the electronic device completes switching. As a result, apparent lag occurs in the electronic device, and user experience is reduced. The synthesizing one frame may be synthesizing image data of the image frame through SF. The losing one frame may be delaying performing SF synthesis, for example, performing SF synthesis at a rising edge or a falling edge of next Vsync-sf, to synthesize the image data of the image frame at the next Vsync-sf; or the losing one frame may be losing the image data of the image frame.

Figure 2:
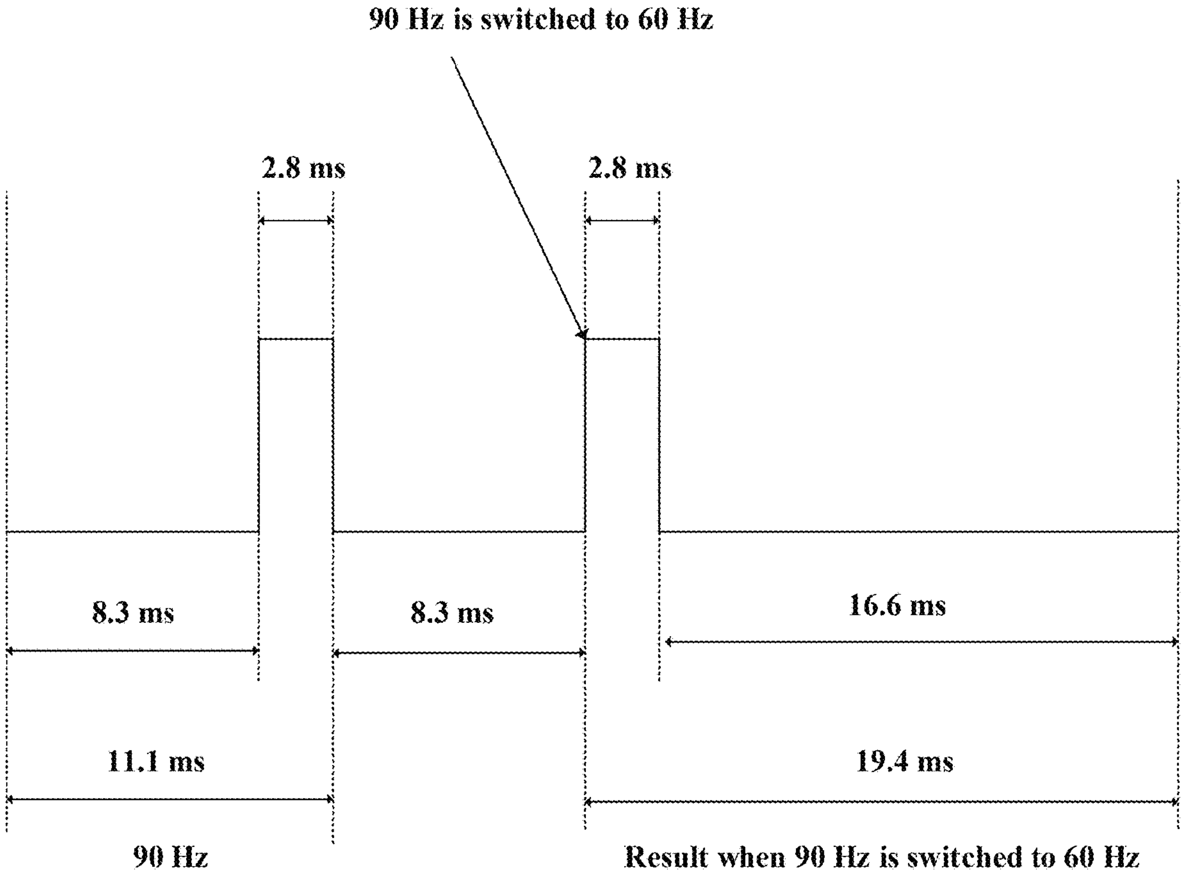
FIG. 2 is a schematic diagram of generating Vsync-hw by a display driver according to an embodiment of this application.

For example, the refresh rate of the electronic device is switched from 90 Hz to 60 Hz. The display driver in the electronic device may generate Vsync-hw, and when the refresh rate is switched, the display driver may simulate refresh rate switching, to adjust the Vsync-hw based on the switched refresh rate. As shown in FIG. 2, when the refresh rate is 90 Hz, the display driver generates Vsync-hw with duration of 11.1 ms, where the Vsync-hw includes a low level with duration of 8.3 ms and a high level with duration of 2.8 ms. The display driver determines that the refresh rate is switched at a rising edge of the Vsync-hw, and the refresh rate is switched from 90 Hz to 60 Hz. The display driver uses the rising edge as a start of one Vsync-hw, where the Vsync-hw includes a high level with duration of 2.8 ms and a low level with duration of 16.6 ms, and time consumption of the Vsync-hw is 19.4 ms. Therefore, the display driver simulates a mechanism of the Vsync-hw at 90 Hz, resulting in Vsync-hw with time consumption of 19.4 ms to exist when the refresh rate is switched from 90 Hz to 60 Hz. Such a phenomenon causes one to two image frames to be lost because SF cannot wait for the fence resource, and also results in alternate occurrence of synthesizing one frame and losing one frame because rising edges and falling edges of Vsync-sf and the Vsync-hw are not aligned continuously, bringing apparent lag.

Figure 3:
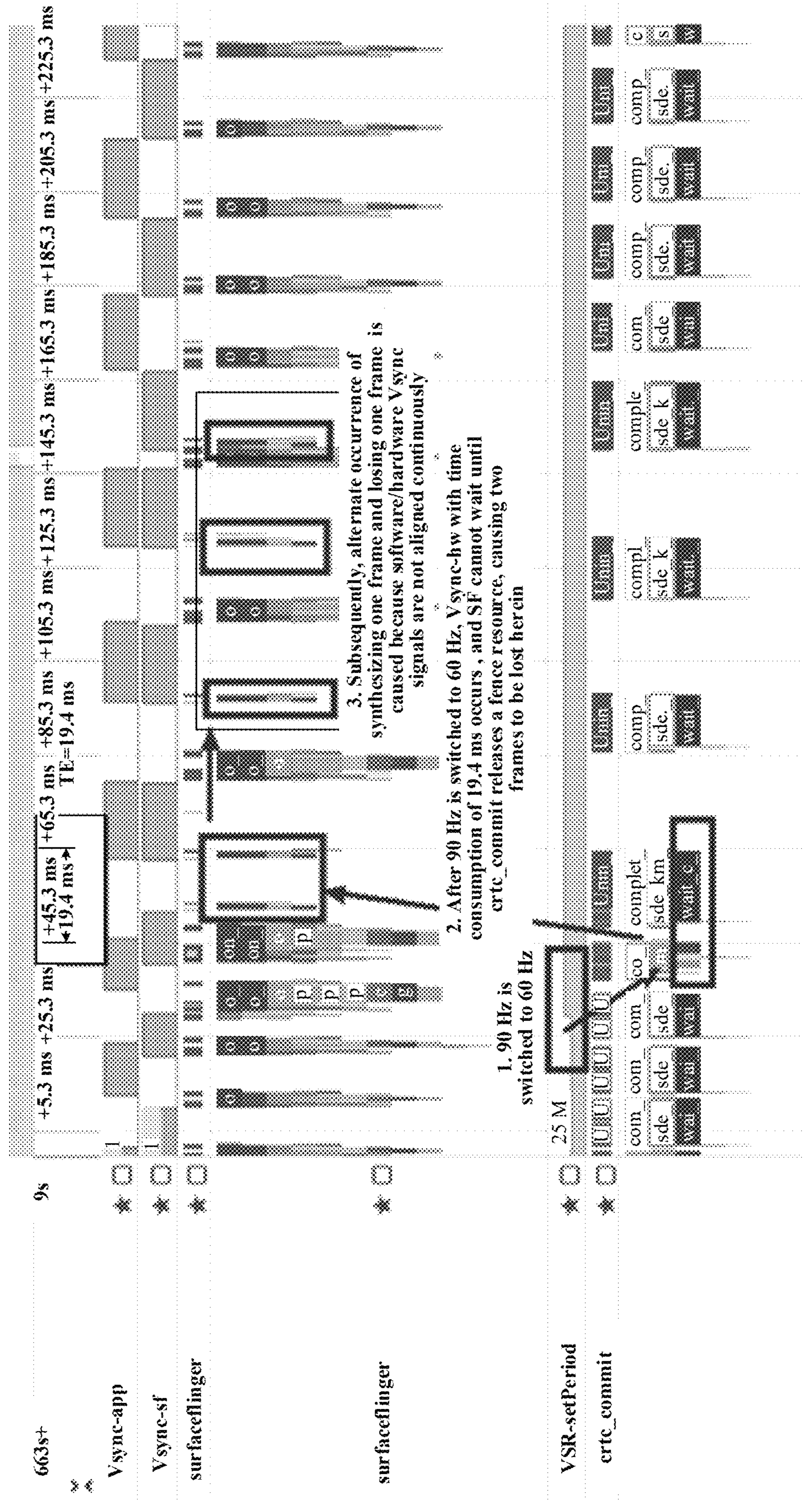
FIG. 3 is a schematic diagram of trace of a frame loss problem according to an embodiment of this application.
Figure 4:
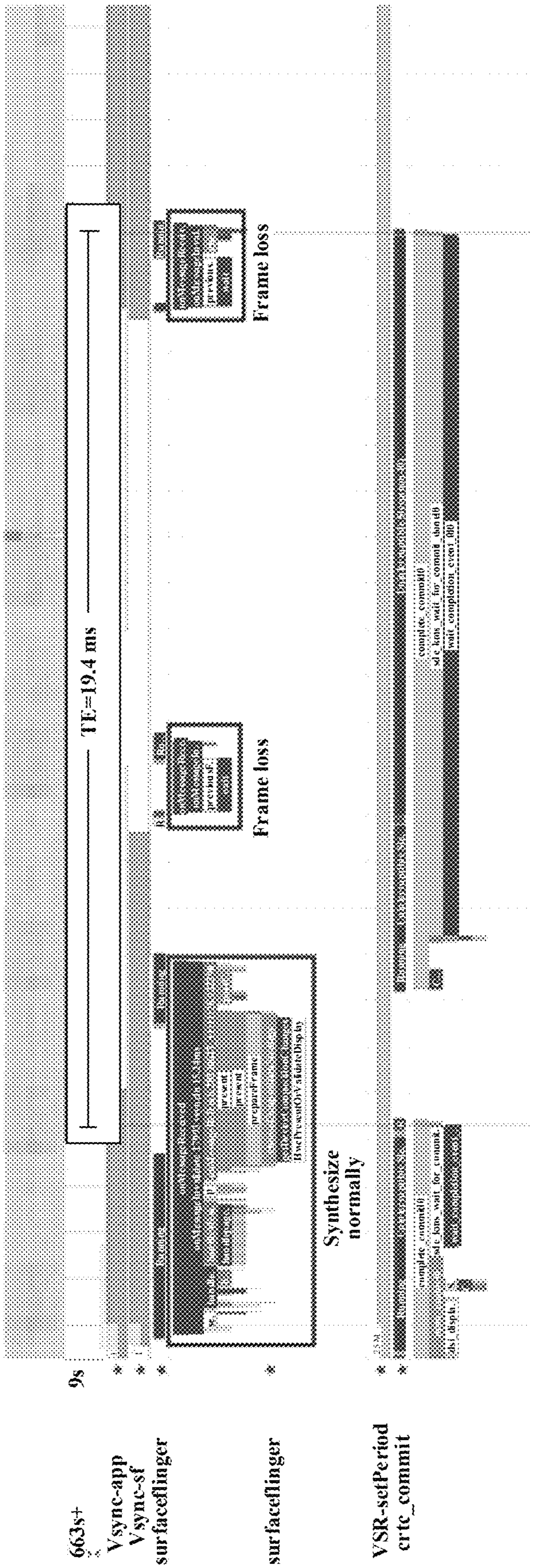
FIG. 4 is an enlarged schematic diagram of a frame loss problem according to an embodiment of this application.

Trace (trace) of the frame loss problem is shown in FIG. 3. When 90 Hz is switched to 60 Hz, Vsync-hw with time consumption of 19.4 ms exists, which is indicated by TE=19.4 ms in FIG. 3. At the duration of 19.4 ms, SF does not wait until crtc_commit releases the fence resource, and a SF synthesis process cannot be performed, resulting in losing two image frames at the duration of 19.4 ms, as shown in 1 and 2 in FIG. 3. Enlarged schematic diagrams of 1 and 2 in FIG. 3 are shown in FIG. 4. onMessageReceived to HwcPresentOrValidateDisplay indicates that SF synthesis is normally performed. If SF always waits (wait), it indicates that SF does not wait until crtc_commit releases the fence resource, and there is a possibility of a frame loss. In FIG. 4, crtc_commit releases the fence resource after SF loses two frames.

At the rising edge and the falling edge of Vsync-sf, if SF waits until crtc_commit releases the fence resource, SF may read the image data. If SF does not wait until crtc_commit releases the fence resource, SF cannot read the image data. After 19.4 ms, if SF waits until the fence resource once every other Vsync-sf, it indicates that SF may read the image data once every other Vsync-sf, resulting in alternate occurrence of synthesizing one frame and losing one frame. As shown in 3 in FIG. 3, a large box pointed to by 3 indicates alternate occurrence of synthesizing one frame and losing one frame, and a small box in the large box indicates losing one frame. For a first small box in the large box pointed to by 3, because SF does not wait until crtc_commit releases the fence resource at the rising edge of the Vsync-sf, and SF does not read the image data, one image frame is lost. Then, SF waits until crtc_commit releases the fence resource at the falling edge of the Vsync-sf, SF may read the image data, and the image data is synthesized through HWC. Therefore, the image data of the image frame is synthesized at the falling edge of the Vsync-sf. After SF loses five image frames, the electronic device starts synthesizing normally at 60 Hz.

For example, in a process of sliding to exit the APP in the electronic device, the refresh rate is switched from 90 Hz to 60 Hz. In the switching process, the electronic device first loses two image frames. After switching is completed, one frame is lost when one frame is refreshed, resulting in lag throughout the process, and reducing user experience.

Figure 5:
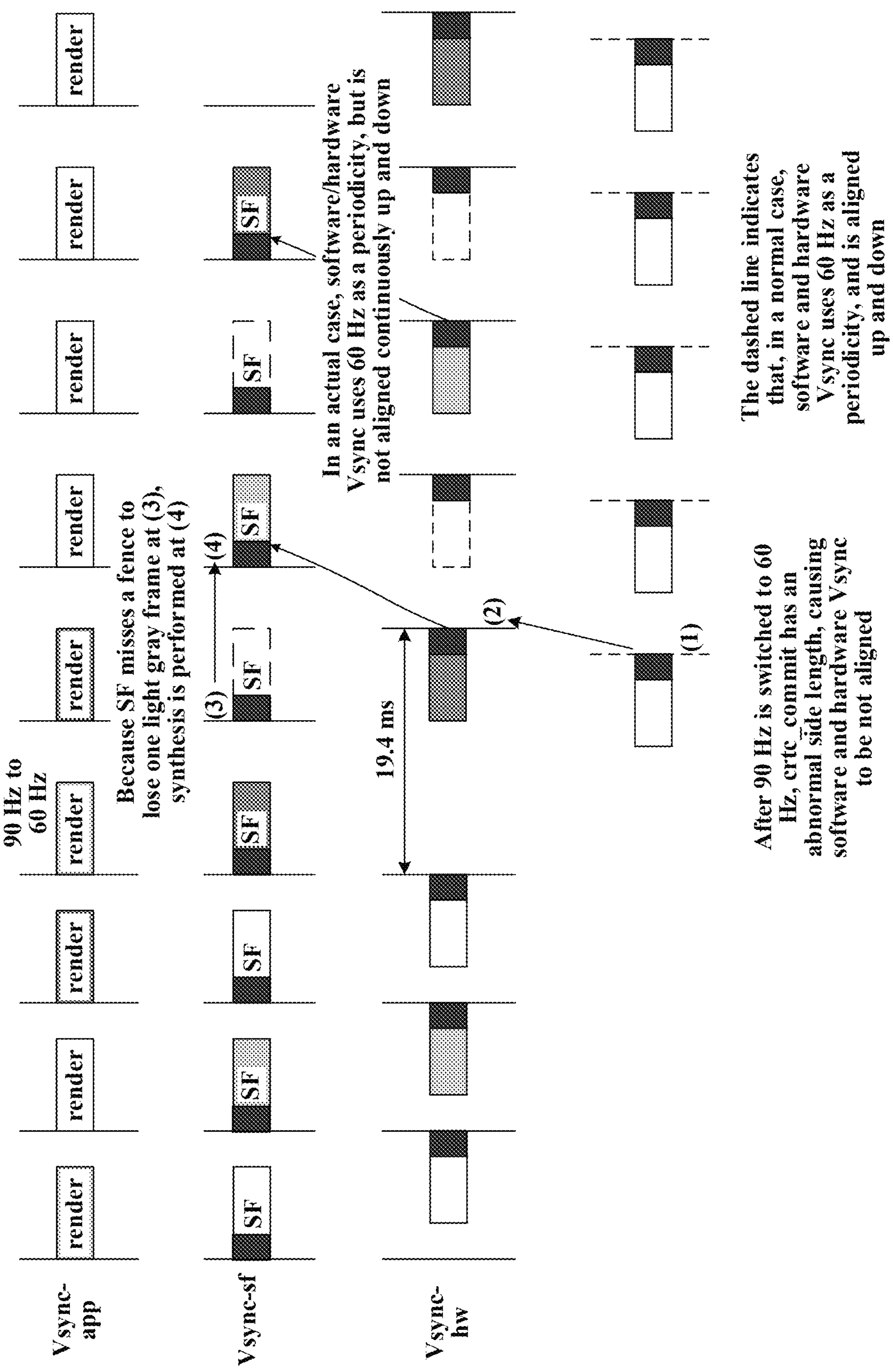
FIG. 5 is a schematic diagram of software/hardware Vsync after a refresh rate is switched according to an embodiment of this application.

After the refresh rate is switched, a schematic diagram of software/hardware Vsync is shown in FIG. 5, which shows a schematic diagram of software/hardware Vsync when 90 Hz is switched to 60 Hz. In FIG. 5, a vertical line may be used as a reference of software/hardware Vsync, to point to start time of software/hardware Vsync.

When the refresh rate is 90 Hz, the periodicities of the Vsync-app, the Vsync-sf, and the Vsync-hw are the same, and at least references of the Vsync-sf and the Vsync-hw in each periodicity are also the same, that is, the Vsync-sf and the Vsync-hw are aligned in each periodicity, where alignment may be that periodicities are the same, the rising edges of the Vsync-sf and the Vsync-hw are same, and the falling edges of the Vsync-sf and the Vsync-hw are the same. For the Vsync-app, the periodicity is the same as those of the Vsync-sf and the Vsync-hw, but a rising edge and a falling edge may be different from those of the Vsync-sf and the Vsync-hw. In FIG. 5, the Vsync-app is aligned with the Vsync-sf and the Vsync-hw. However, when the refresh rate is switched from 90 Hz to 60 Hz, Vsync-hw with long time consumption occurs. For example, in FIG. 5, time consumption of the Vsync-hw in a fourth periodicity is 19.4 ms, that is, the Vsync-hw with long time consumption in the fourth periodicity occurs, and the periodicity of the Vsync-hw increases from 11.1 ms to 19.4 ms, but periodicities of the Vsync-app and the Vsync-sf in the fourth periodicity are still 11.1 ms. Therefore, the periodicity of the Vsync-hw in the fourth periodicity is different from the periodicities of the Vsync-app and the Vsync-sf in the fourth periodicity. As a result, a reference of the Vsync-hw in the fourth periodicity is different from references of the Vsync-app and the Vsync-sf in the fourth periodicity, and the Vsync-app, the Vsync-sf, and the Vsync-hw are not aligned starting from the fifth periodicity.

As shown in FIG. 5, although periodicities of the Vsync-app, the Vsync-sf, and the Vsync-hw are 16.6 ms when the refresh rate is switched to 60 Hz, the Vsync-hw originally ending at (1) ends at (2) because the time consumption of the Vsync-hw is long in the fourth periodicity. As a result, the periodicity of the Vsync-hw in the fourth periodicity is different from the periodicities of the Vsync-app and the Vsync-sf in the fourth periodicity, and an end of the Vsync-hw in the fourth periodicity is different from ends of the Vsync-app and the Vsync-sf in the fourth periodicity. In this way, starting from the fifth periodicity, the Vsync-app, the Vsync-sf, and the Vsync-hw are not aligned continuously up and down in an actual case.

In addition, because the Vsync-hw ends at (2) in the fourth periodicity, crtc_commit originally releasing the fence resource at (1) delays to release the fence resource at (2). Because (2) is not at the rising edge or the falling edge of the Vsync-sf, SF synthesis is delayed by one Vsync-sf, to be specific, as shown in FIG. 5, because SF misses the fence resource to lose one frame at (3), SF synthesis originally performed at (3) is actually performed at (4).

Figure 6:
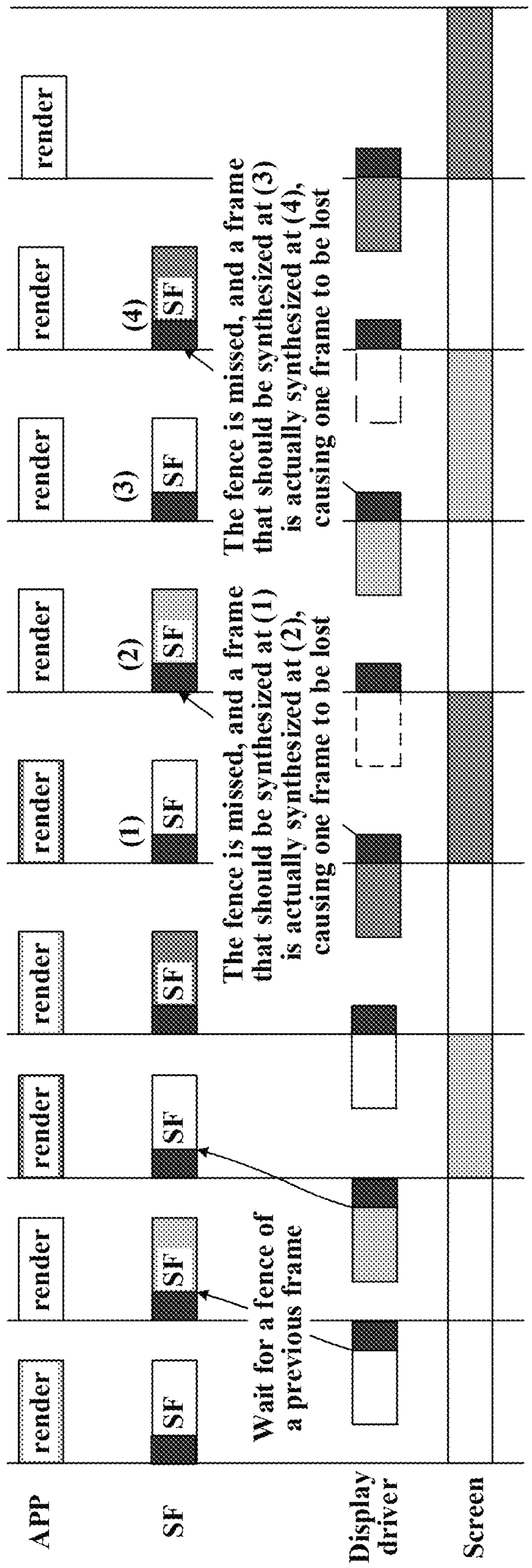
FIG. 6 is a schematic diagram of performing rendering to displaying of an image frame by using Vsync-app, Vsync-sf, and Vsync-hw after a refresh rate is switched according to an embodiment of this application.

Under action of software/hardware Vsync shown in FIG. 5, a process of completing rendering to displaying of the image frame by using the Vsync-app, the Vsync-sf, and the Vsync-hw is shown in FIG. 6. It can be seen from FIG. 6 that, before the refresh rate is switched from 90 Hz to 60 Hz, the APP completes rendering in one periodicity, and crtc_commit may release the fence resource in the periodicity, which means that SF may wait for the fence resource in a next periodicity, and SF synthesis is performed in the next periodicity. After SF synthesis, the display driver performs sending and display in the next periodicity, so that the image frame is displayed on the screen in the next periodicity, to complete rendering to display of the image frame in the three periodicities. However, when the refresh rate is switched from 90 Hz to 60 Hz, time consumed by crtc_commit to release the fence resource increases. As shown in (1) in FIG. 6, the fence resource that should be released at an end of the fourth periodicity is released after a start of the fifth periodicity, making SF synthesis of the fifth periodicity delayed to a sixth periodicity, to be specific, because the fence resource is missed at (1), SF synthesis that should be performed at (1) is actually performed at (2), and the SF synthesis delay results in losing one frame; and similarly, because the fence resource is missed at (3), SF synthesis that should be performed at (3) is actually performed at (4), causing one frame to be lost. In other words, relative to that one image frame is generated under each Vsync-app, one image frame is generated every other Vsync-app after the refresh rate is switched.

It can be learned from FIG. 3 to FIG. 6 that, when the electronic device switches from an APP with a high refresh rate to an APP with a low refresh rate, the periodicity of the Vsync-hw is too long, resulting in a frame loss problem in the APP switching process. After switching is completed, the Vsync-app, the Vsync-sf, and the Vsync-hw are not aligned, resulting in alternate occurrence of synthesizing one frame and losing one frame after switching is completed. As a result, apparent lag occurs in the electronic device, and user experience is reduced.

For this problem, this application provides a display method. In the display method, in response to switching from a high refresh rate to a low refresh rate, image data of an image frame is synthesized when an instruction that crtc_commit releases a fence resource is received but Vsync-sf is not received. In other words, when the high refresh rate is switched to the low refresh rate, although SF is not at a rising edge or a falling edge of the Vsync-sf, SF determines that crtc_commit releases the fence resource (that is, display of the image frame is completed). In this case, SF may immediately read the image data after crtc_commit releases the fence resource, to immediately perform SF synthesis, and the image data of the image frame is synthesized in advance relative to waiting to receive the Vsync-sf to read the image data, so that the image data of the image frame can be quickly synthesized when the high refresh rate is switched to the low refresh rate, thereby reducing a quantity of lost frames.

In some examples, in response to switching to a low refresh rate, Vsync-app, Vsync-sf, and Vsync-hw are synchronized, that is, after the low refresh rate is switched to, the Vsync-app, the Vsync-sf, and the Vsync-hw are aligned, to resolve alternate occurrence of synthesizing one frame and losing one frame because the Vsync-app, the Vsync-sf, and the Vsync-hw are not aligned after switching.

Figure 7:
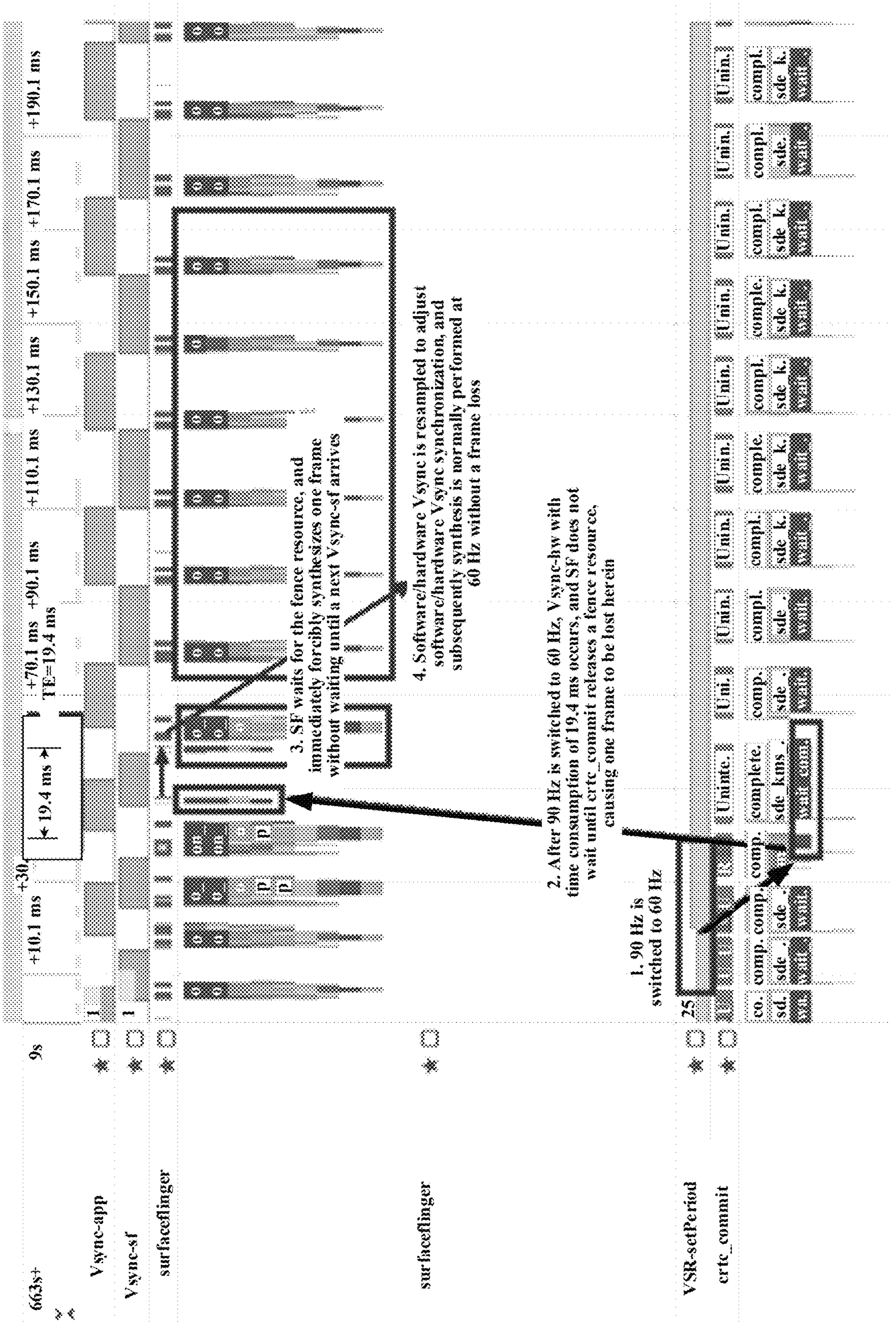
FIG. 7 is a schematic diagram of trace of optimizing a frame loss problem according to an embodiment of this application.
Figure 8:
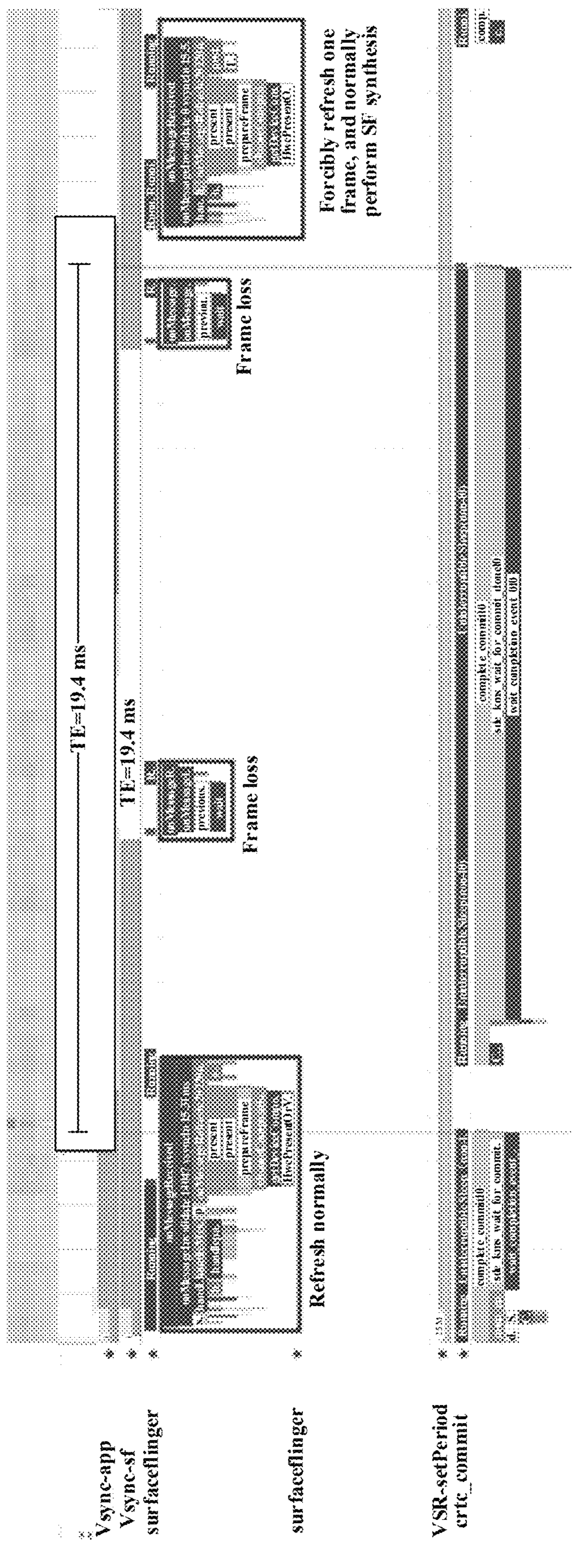
FIG. 8 is an enlarged schematic diagram of optimizing a frame loss problem according to an embodiment of this application.

FIG. 7 is a schematic diagram of trace of optimizing a frame loss problem after an electronic device implements the display method of this application. In FIG. 7, a refresh rate is switched from 90 Hz to 60 Hz. When the refresh rate is switched from 90 Hz to 60 Hz, time consumption of Vsync-hw in one frame is extended from 11.1 ms to 19.4 ms (as shown in TE=19.4 ms in FIG. 7). Vsync-hw with time consumption of 19.4 ms covers one Vsync-sf, and crtc_commit generally completes release of a fence resource at an end position of the Vsync-hw. As a result, SF does not wait until crtc_commit releases the fence resource under the covered Vsync-sf, resulting in a loss of two frames under the Vsync-hw with the time consumption of 19.4 ms. After the Vsync-hw with the time consumption of 19.4 ms ends, SF determines that crtc_commit releases the fence resource, and SF synthesis is immediately performed, to immediately and forcibly synthesize image data of one image frame. In other words, although SF is not at a rising edge or a falling edge of the Vsync-sf, SF determines that crtc_commit releases the fence resource, and SF synthesis is immediately performed, to forcibly synthesize the image data of the image frame.

To be specific, generally, SF synthesis needs to meet two conditions: One condition is that SF is at the rising edge or the falling edge of the Vsync-sf, and the other condition is that SF determines that crtc_commit releases the fence resource. However, when the high refresh rate is switched to the low refresh rate, Vsync-hw with long time consumption occurs, and SF synthesis needs to meet only one condition, where the condition may be that SF determines that crtc_commit releases the fence resource. In this way, SF does not need to wait for a rising edge or a falling edge of next Vsync-sf, and SF synthesis at the next Vsync-sf is advanced, so that image data of one image frame can be synthesized in advance.

The image data synthesized in advance may be image data of any of lost two image frames. Although the two frames are lost under the Vsync-hw with the time consumption of 19.4 ms, the image data of any of the lost two image frames may be immediately synthesized after the Vsync-hw with the time consumption of 19.4 ms ends, which is equivalent to losing one frame, thereby reducing a quantity of lost frames. In some examples, image data of a first frame of the lost two image frames may be immediately synthesized after the Vsync-hw with the time consumption of 19.4 ms ends, to ensure continuity of images. In some examples, image data of a second frame of the lost two image frames may be immediately synthesized after the Vsync-hw with the time consumption of 19.4 ms ends, to shorten a synthesis delay of the second image frame.

The Vsync-hw with the time consumption of 19.4 ms may cause subsequent Vsync-app, Vsync-sf, and Vsync-hw to be not aligned, and that the Vsync-app, the Vsync-sf, and the Vsync-hw are not aligned may result in alternate occurrence of synthesizing one frame and losing one frame in the electronic device. For this problem, after the refresh rate is switched to the low refresh rate, the electronic device may align the Vsync-app, the Vsync-sf, and the Vsync-hw. After the Vsync-app, the Vsync-sf, and the Vsync-hw are aligned, SF may read image data from a buffer at the rising edge and the falling edge of the Vsync-sf respectively, and the image data is synthesized by HWC, to perform SF synthesis at the rising edge and the falling edge of the Vsync-sf respectively, so that the electronic device may perform, after the refresh rate is switched to 60 Hz, SF synthesis at the rising edge and the falling edge of the Vsync-sf based on 60 Hz, thereby avoiding an image frame loss.

Figure 9:
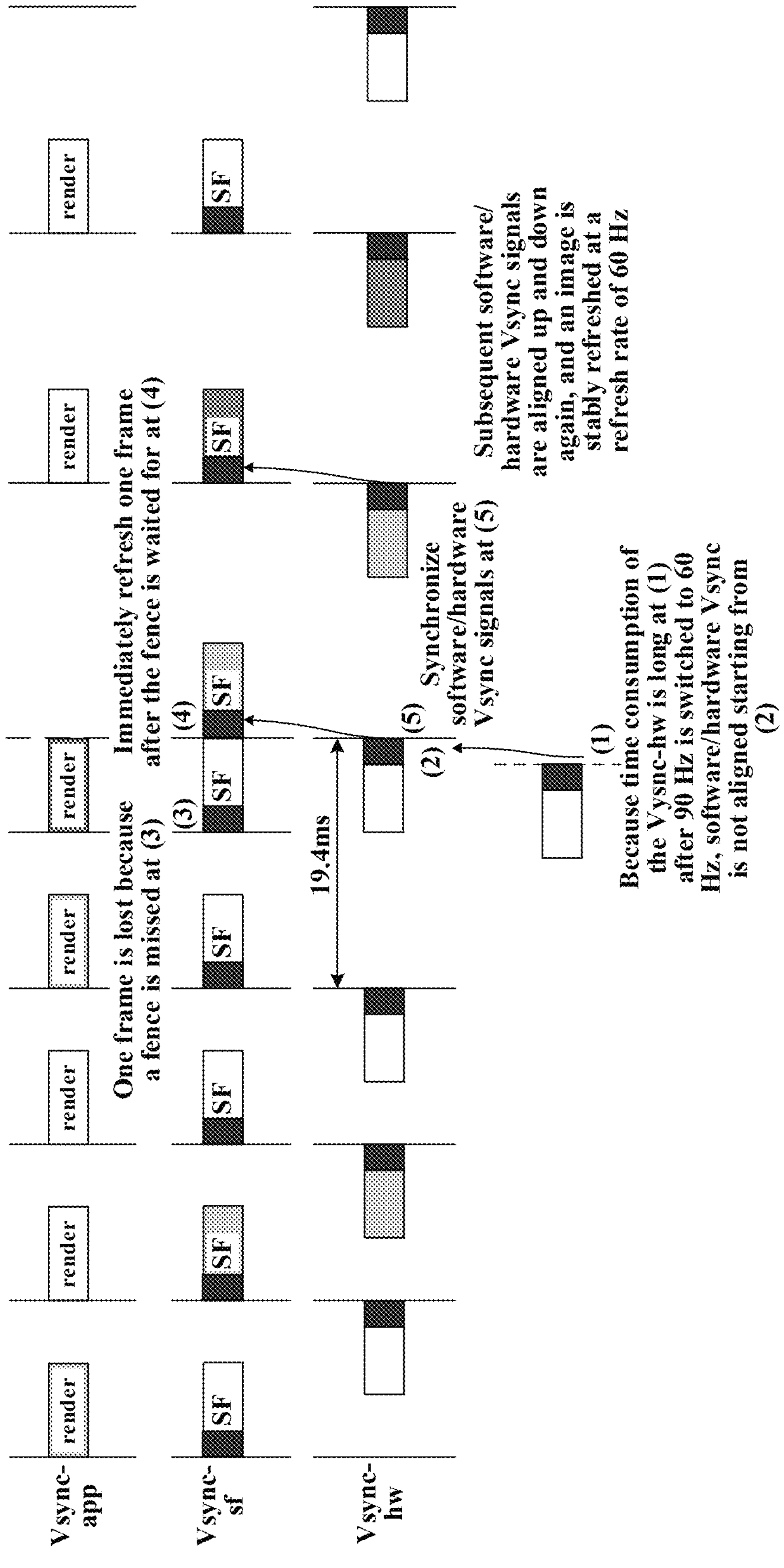
FIG. 9 is a schematic diagram of optimizing software/hardware Vsync after a refresh rate is switched according to an embodiment of this application.

The following describes with reference to the accompanying drawings. A schematic diagram of optimizing software/hardware Vsync after a refresh rate is switched is shown in FIG. 9. In FIG. 9, when the refresh rate is 90 Hz, periodicities of the Vsync-app, the Vsync-sf, and the Vsync-hw are the same, and references of the Vsync-app, the Vsync-sf, and the Vsync-hw in each periodicity are also the same. However, when the refresh rate is switched from 90 Hz to 60 Hz, Vsync-hw with long time consumption occurs. For example, in FIG. 9, time consumption of the Vsync-hw in a fourth periodicity is 19.4 ms, that is, the Vsync-hw with long time consumption occurs in the fourth periodicity. In this case, crtc_commit originally releases the fence resource before an end of (1), but because the refresh rate is switched from 90 Hz to 60 Hz, crtc_commit releases the fence resource at (2), and completes release of the fence resource at (5) (that is, an end of the fourth periodicity), resulting in SF synthesis not being performed because the fence resource is missed at (3), and losing one frame. A position of (4) is an end of the Vsync-hw in the fourth periodicity, SF waits until crtc_commit releases the fence resource at (4), and SF synthesis is immediately performed at (4), to synthesize image data of one image frame, so that the image frame may be forcibly refreshed, that is, the image frame is forcibly displayed in a fifth periodicity.

In the fifth periodicity, end time of the Vsync-app, the Vsync-sf, and the Vsync-hw is the same. In this case, in a sixth periodicity, start time of the Vsync-app, the Vsync-sf, and the Vsync-hw is the same; and in addition, because the periodicities of the Vsync-app, the Vsync-sf, and the Vsync-hw are the same, the Vsync-app, the Vsync-sf, and the Vsync-hw are aligned up and down in the sixth periodicity. As shown in FIG. 9, starting from the sixth periodicity, the Vsync-app, the Vsync-sf, and the Vsync-hw are aligned up and down. By using the Vsync-hw as an example, the sixth periodicity may use a sixth vertical line in FIG. 9 as start time, and use a seventh vertical line as end time, so that subsequent software/hardware Vsync may be aligned, and the electronic device may stably refresh (display) an image at the refresh rate of 60 Hz.

Figure 10:
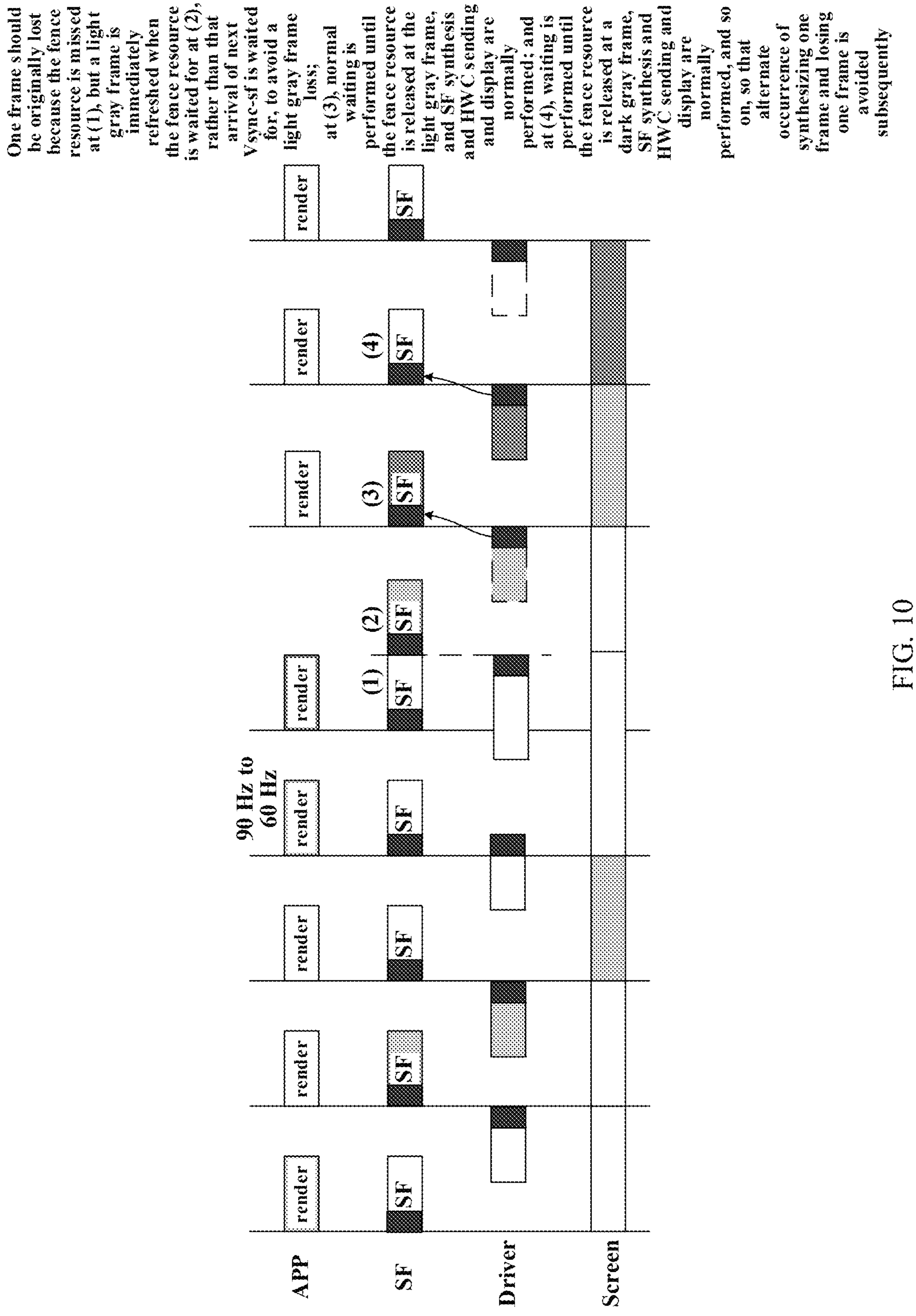
FIG. 10 is a schematic diagram of performing rendering to displaying of an image frame by using optimized Vsync-app, Vsync-sf, and Vsync-hw according to an embodiment of this application.

After software/hardware Vsync is optimized, a process of completing rendering to displaying of the image frame by using the Vsync-app, the Vsync-sf, and the Vsync-hw is shown in FIG. 10. One frame should be originally lost because the fence resource is missed at (1), but a light gray frame is immediately refreshed when the fence resource is waited for at (2), rather than that arrival of next Vsync-sf (specifically, a rising edge or a falling edge of the Vsync-sf) is waited for, to avoid a light gray frame loss; at (3), normal waiting is performed until the fence resource is released at the light gray frame, and SF synthesis and HWC sending and display are normally performed; and at (4), waiting is performed until the fence resource is released at a dark gray frame, SF synthesis and HWC sending and display are normally performed, and so on, so that alternate occurrence of synthesizing one frame and losing one frame is avoided subsequently, thereby reducing lag, and improving user experience.

The display method may be applied to an electronic device. In some embodiments, the electronic device may be a mobile phone, a tablet computer, a desktop computer, a laptop computer, a notebook computer, an ultra-mobile personal computer (UMPC), a handheld computer, a netbook, a personal digital assistant (PDA), a wearable electronic device, a smart watch, or the like. A specific form of the electronic device is not limited in this application.

Figure 11:
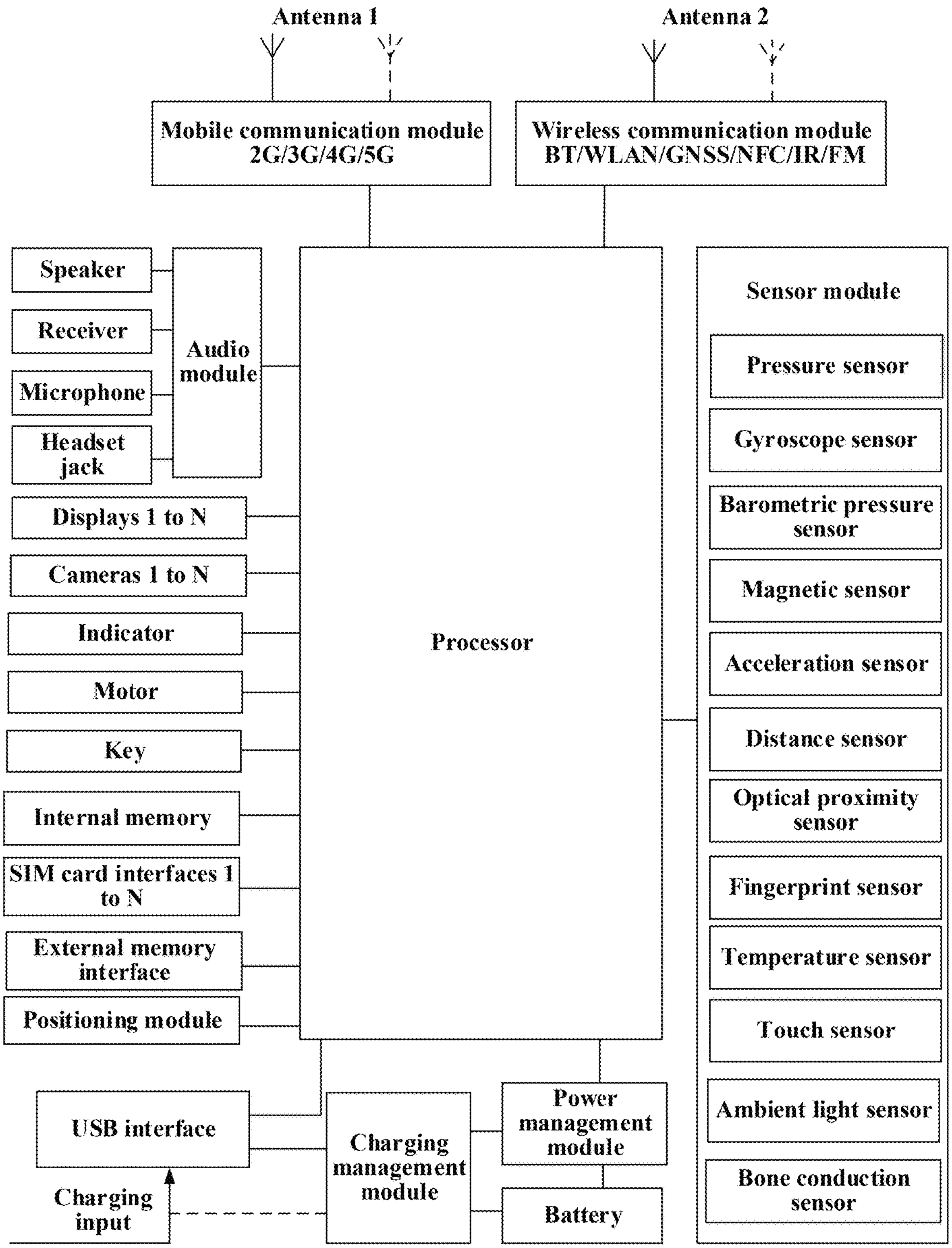
FIG. 11 is a diagram of a hardware architecture of an electronic device according to an embodiment of this application.

As shown in FIG. 11, the electronic device may include a processor, an external memory interface, an internal memory, a universal serial bus (USB) interface, a charging management module, a power management module, a battery, an antenna 1, an antenna 2, a mobile communication module, a wireless communication module, a sensor module, a key, a motor, an indicator, a camera, a display (also referred to as a screen), a subscriber identity module (SIM) card interface, and the like. The audio module may include a speaker, a receiver, a microphone, a headset jack, and the like. The sensor module may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

The processor may include one or more processing units. For example, the processor may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent devices, or may be integrated into one or more processors. The processor is a neural center and a command center of the electronic device. The controller may generate an operation control signal based on instruction operation code and a time sequence signal, to implement control of instruction fetching and instruction executing.

The display is configured to display images, videos, a series of graphical user interfaces (GUI), and the like.

The external memory interface may be configured to connect to an external storage card, for example, a micro SD card, to expand a storage capability of the electronic device. The external storage card communicates with the processor by using the external memory interface, to implement a data storage function, for example, to store files such as music and a video into the external memory card. The internal memory may be configured to store computer-executable program code, where the executable program code includes instructions. The processor runs the instructions stored in the internal memory, to implement various functional applications and data processing of the electronic device. For example, in this application, the processor executes the instructions stored in the internal memory, so that the electronic device performs the display method provided in this application.

It may be understood that, a structure illustrated in this embodiment does not constitute a specific limitation on the electronic device. In some other embodiments, the electronic device may include more or fewer components than those shown in the figure, or some components may be combined, or some components may be split, or a different component arrangement may be used. The illustrated components may be implemented by hardware, software, or a combination of software and hardware.

In addition, an operating system is running on the foregoing components, for example, an iOS operating system developed by Apple Inc., an Android open-source operating system developed by Google Inc., or a Windows operating system developed by Microsoft Corporation.

Figure 12:
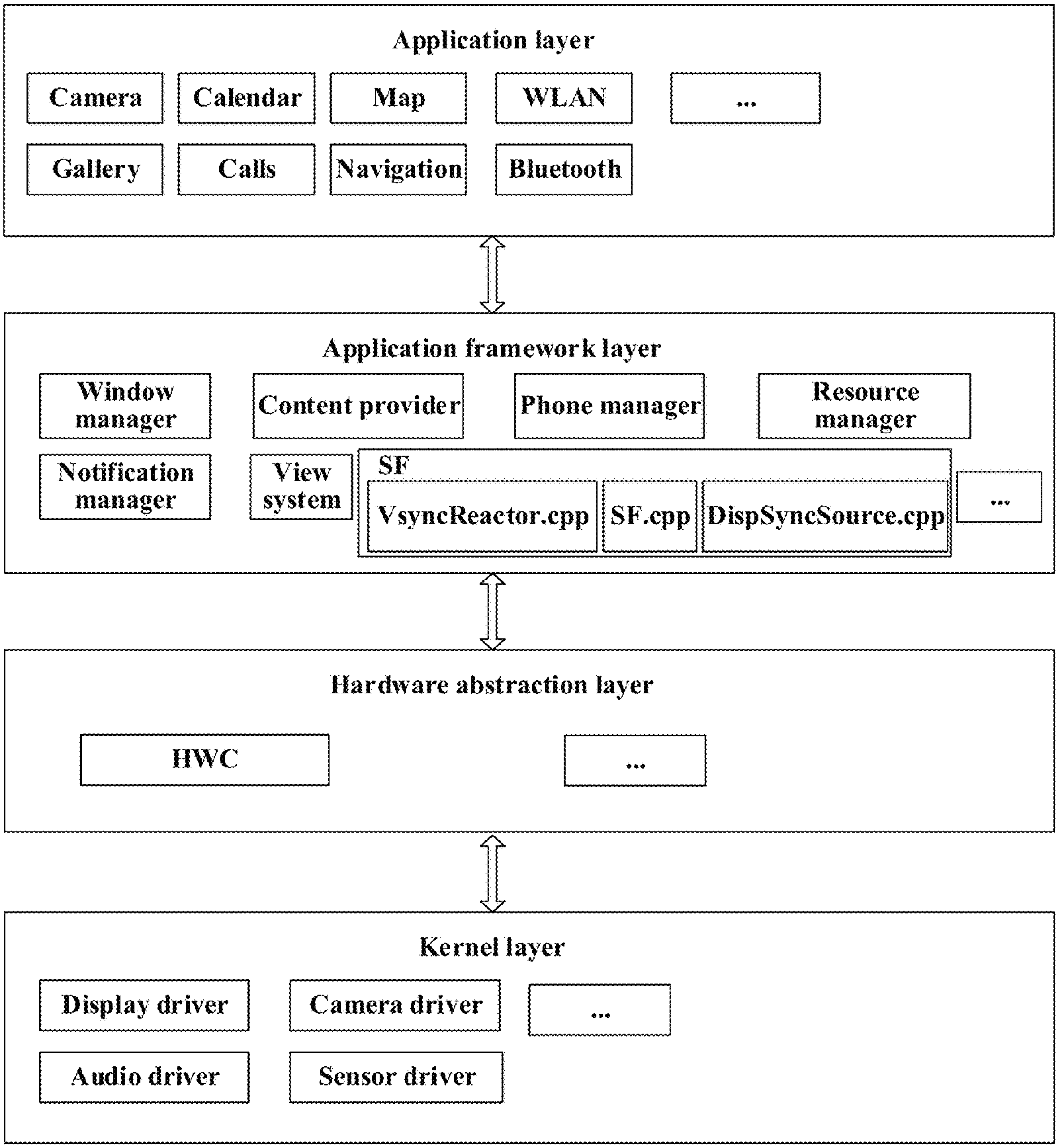
FIG. 12 is a diagram of a software architecture of an electronic device according to an embodiment of this application.

The operating system of the electronic device may use a layered architecture, an event-driven architecture, a micro core architecture, a micro service architecture, or a cloud architecture. In this embodiment of this application, an Android system with the layered architecture is used as an example to describe a software structure of the electronic device. FIG. 12 is a diagram of a software architecture of the electronic device. In a layered architecture, software is divided into a plurality of layers, and each layer has a clear role and task. The layers communicate with each other through a software interface. By using the Android system as an example, in some embodiments, the Android system is divided into four layers that are respectively an application layer, an application framework layer (Framework), a hardware abstraction layer (HAL), and a kernel layer (Kernel) from top to bottom.

The application layer may include a series of application packages. The application packages may include APPs such as a camera, a gallery, a calendar, a call, a map, a navigation, WLAN, Bluetooth, music, a video, and an SMS message. The application framework layer provides an application programming interface (Application Programming Interface, API) and a programming framework for the applications at the application layer. The application framework layer includes some predefined functions. For example, the application framework layer may include a window manager, a content provider, a view system, a phone manager, a resource manager, a notification manager, and the like. The application framework layer may further include SF, where SF includes DispSyncSource.cpp, SF.cpp, and VsyncReactor.cpp. DispSyncSource.cpp, SF.cpp, and VsyncReactor.cpp may be regarded as three units of SF, for example, DispSyncSource.cpp may be referred to as a signal generation unit, SF.cpp may be referred to as a data reading unit, and VsyncReactor.cpp may be referred to as a refresh rate processing unit. HAL may include HWC. The kernel layer is a layer between hardware and software. The kernel layer includes at least a display driver, a camera driver, an audio driver, and a sensor driver. HWC may be configured to synthesize image data, and in a process of synthesizing the image data, functions such as setCallback, registerCallback, and onComposerhalVsync may be invoked.

VsyncReactor.cpp may sample Vsync-hw, and DispSyncSource.cpp generates Vsync-app and Vsync-sf based on a sampling result. VsyncReactor.cpp may invoke addResyncSample to sample the Vsync-hw, to obtain a timestamp of the Vsync-hw, where the timestamp of the Vsync-hw is an example of the sampling result. The timestamp of the Vsync-hw may be stored in a timestamp sequence through addHwVsyncTimestamp. VsyncReactor.cpp may further invoke periodConfirmed for scene recognition. After switching from a high refresh rate to a low refresh rate is recognized and Vsync-hw with long time consumption occurs, VsyncReactor.cpp may send, after determining that crtc_commit releases a fence resource, an instruction to SF.cpp to indicate SF.cpp to perform SF synthesis with HWC, and VsyncReactor.cpp adjusts the timestamp sequence, to ensure that the Vsync-app, the Vsync-sf, and the Vsync-hw may be aligned after a refresh rate is switched.

Figure 13A:
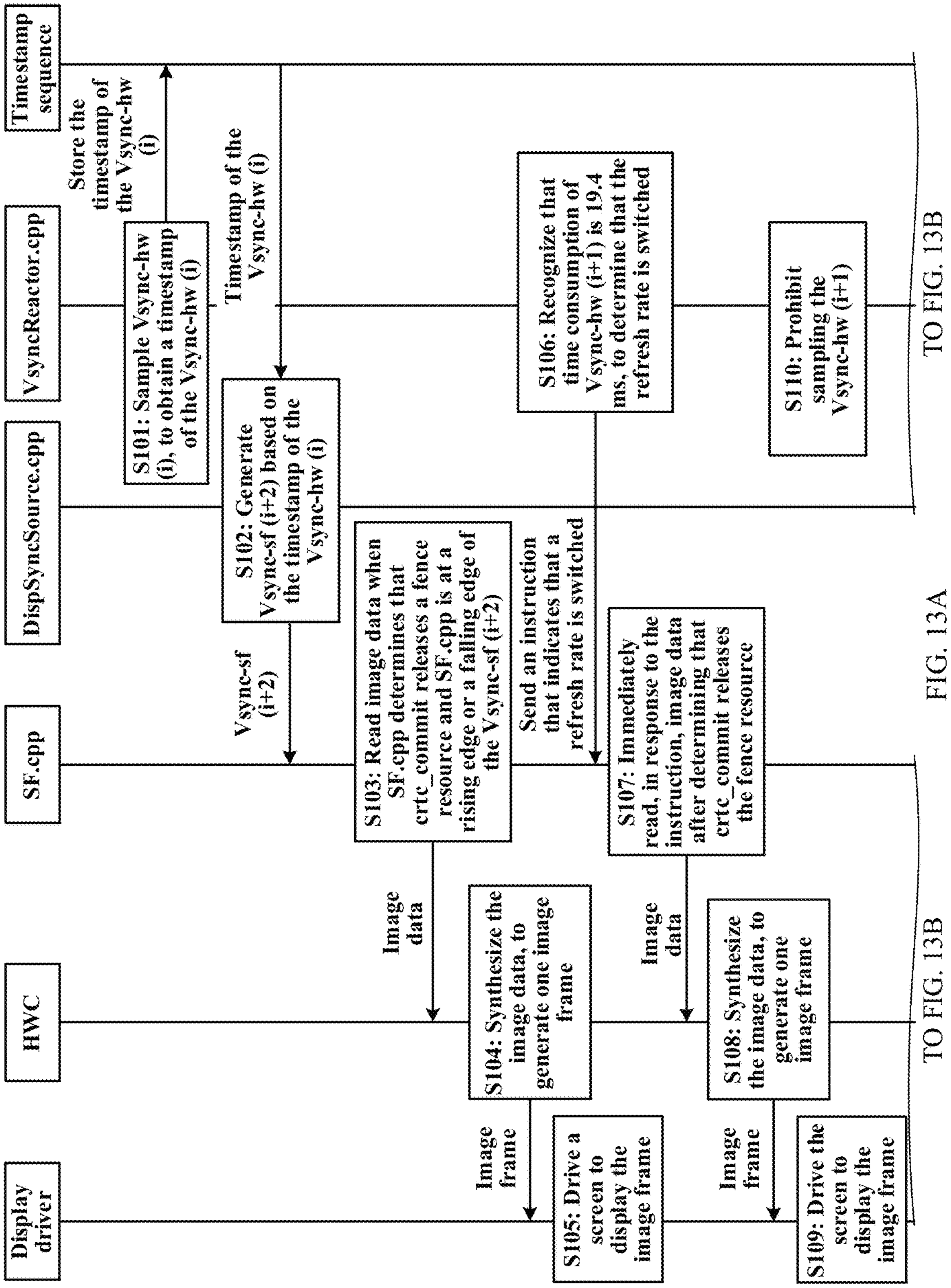
FIG. 13A and FIG. 13B are diagrams of signaling of a display method according to an embodiment of this application.
Figure 13B:
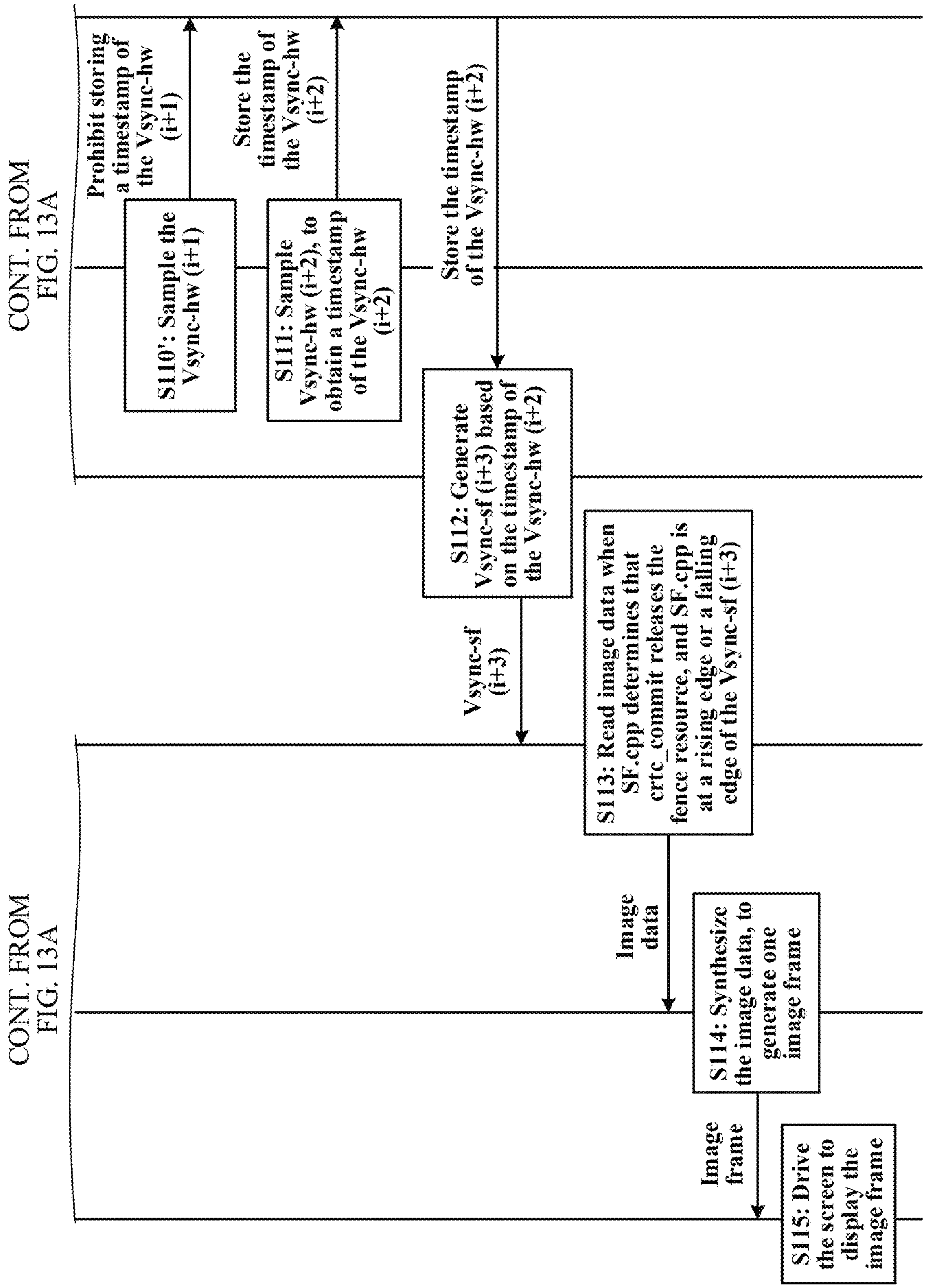

An example in which the refresh rate of the electronic device is 90 Hz, and the refresh rate is switched from 90 Hz to 60 Hz is used to describe an interaction process among DispSyncSource.cpp, SF.cpp, VsyncReactor.app, and HWC. Diagrams of signaling are shown in FIG. 13A and FIG. 13B, and the following steps may be included.

S101: VsyncReactor.cpp invokes addResyncSample to sample Vsync-hw (i), to obtain a timestamp of the Vsync-hw (i), where the timestamp of the Vsync-hw (i) is stored in a timestamp sequence. For example, VsyncReactor.cpp invokes addHwVsyncTimestamp to store the timestamp of the Vsync-hw (i) in the timestamp sequence.

S102: DispSyncSource.cpp generates Vsync-sf (i+2) based on the timestamp of the Vsync-hw (i). The Vsync-sf (i+2) is second Vsync-sf after Vsync-sf (i), and the Vsync-hw (i) and the Vsync-sf (i) correspond to a same periodicity. In this embodiment, the Vsync-hw (i) and Vsync-sf (i) are Vsync-hw and Vsync-sf in an $i^{th}$ periodicity. When generating the Vsync-sf (i+2), SF may further generate Vsync-app (i+2), and an APP generates image data under action of the Vsync-app (i+2). This is not described herein in detail. That the Vsync-sf (i+2) is generated based on the timestamp of the Vsync-hw (i) is merely an example, and this is not limited in this embodiment.

S103: SF.cpp reads the image data when SF.cpp determines that crtc_commit releases a fence resource and SF.cpp is at a rising edge or a falling edge of the Vsync-sf (i+2). That SF.cpp is at the rising edge of the Vsync-sf (i+2) indicates that a level of the Vsync-sf (i+2) changes from a low level to a high level, and that SF.cpp is at the falling edge of the Vsync-sf (i+2) indicates that the level of the Vsync-sf (i+2) changes from the high level to the low level.

S104: HWC synthesizes the image data, to complete SF synthesis through SF.cpp and HWC, and generate one image frame.

S105: HWC may send the synthesized image data to a display driver, and the display driver drives a screen to display the image frame.

S106: VsyncReactor.cpp invokes periodConfirmed to recognize that time consumption of Vsync-hw (i+1) is 19.4 ms, to determine that the refresh rate is switched; and VsyncReactor.cpp sends an instruction that indicates that the refresh rate is switched to SF.cpp, where the instruction may further carry the time consumption of the Vsync-hw (i+1) in addition to indicating that the refresh rate is switched. The Vsync-hw (i+1) is next Vsync-hw of the Vsync-hw (i).

Ideally, if the next Vsync-hw signal ends at current time, a difference between the current time and start time of the Vsync-hw is equal to a periodicity of the Vsync-hw. Therefore, periodConfirmed may recognize whether a preset scenario occurs depending on whether the difference exceeds a preset threshold, where the preset scenario is a scenario in which Vsync-hw with long time consumption occurs after the refresh rate is switched. When the refresh rate is switched from 90 Hz to 60 Hz, the preset threshold may be, but is not limited to, a value less than 19.4 ms, for example, may be a value between 11.1 and 19.4. Alternatively, periodConfirmed may recognize whether the preset scenario occurs depending on whether the difference is within a preset value range, where the preset value range may be from 11.1 to 19.4, and the preset value range may not include 11.1, but may include 19.4. In another refresh rate switching scenario, the preset threshold is not limited to being determined based on 19.4 ms. For the preset threshold, this is not limited in this embodiment.

S107: SF.cpp immediately reads, in response to the instruction, image data after determining that crtc_commit releases the fence resource.

S108: HWC synthesizes the image data, to generate one image frame.

S109: HWC may send the synthesized image data to the display driver, and the display driver drives the screen to display the image frame.

In other words, SF.cpp receives the instruction sent by VsyncReactor.cpp. If the instruction indicates that the refresh rate is switched and time consumption of the Vsync-hw (i) is 19.4 ms, SF.cpp does not need to wait for the rising edge and the falling edge of the Vsync-sf, and SF may read the image data after determining that crtc_commit releases the fence resource, so that SF reads the image data in advance, and HWC also synthesizes the image data in advance.

S110: VsyncReactor.cpp prohibits invoking addResyncSample to sample the Vsync-hw (i+1), so that a timestamp of the Vsync-hw (i+1) is not stored in the timestamp sequence.

S110': VsyncReactor.cpp invokes addResyncSample to sample the Vsync-hw (i+1), but prohibits invoking addHwVsyncTimestamp to store the timestamp of the Vsync-hw (i+1) in the timestamp sequence, so that the timestamp of the timestamp of the Vsync-hw (i+1) is also not stored in the timestamp sequence.

S111: VsyncReactor.cpp invokes addResyncSample to sample Vsync-hw (i+2), to obtain a timestamp of the Vsync-hw (i+2), and invokes addHwVsyncTimestamp to store the timestamp of the Vsync-hw (i+2) in the timestamp sequence.

S112: DispSyncSource.cpp generates Vsync-sf (i+3) based on the timestamp of the Vsync-hw (i+2), where the generated Vsync-sf (i+3) is aligned with Vsync-hw (i+3).

S113: SF.cpp reads image data when SF.cpp determines that crtc_commit releases the fence resource, and SF.cpp is at a rising edge or a falling edge of the Vsync-sf (i+3).

S114: HWC synthesizes the image data, to complete SF synthesis through SF.cpp and HWC, and generate one image frame.

S115: HWC may send the synthesized image data to the display driver, and the display driver drives the screen to display the image frame.

The Vsync-sf (i+3) and the Vsync-hw (i+3) are aligned, to ensure that the Vsync-app, the Vsync-sf, and the Vsync-hw may be aligned after the refresh rate is switched. Under action of a rising edge or a falling edge of subsequent Vsync-sf, SF reads image data, and HWC synthesizes the image data, to complete SF synthesis through SF and HWC, and generate one image frame. In this way, starting from the Vsync-sf (i+3), the electronic device can normally generate an image frame, thereby avoiding synthesizing one frame and losing one frame.

Figure 14:
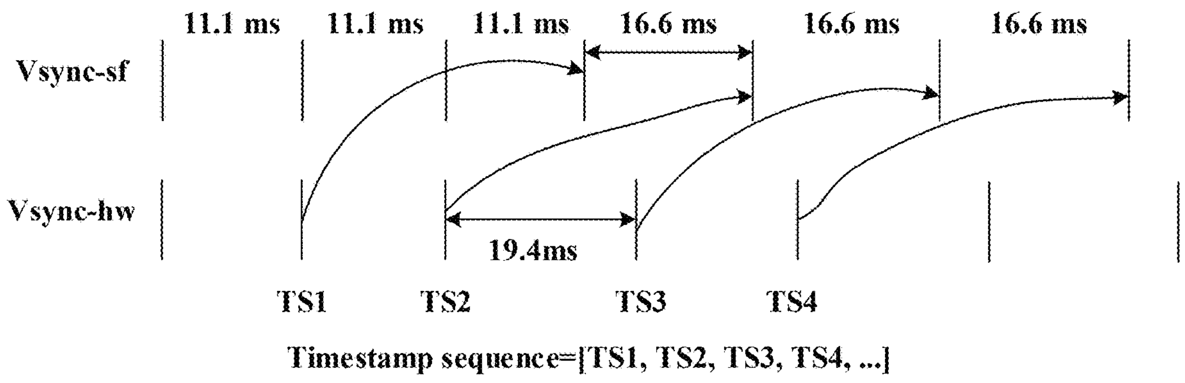
FIG. 14 and FIG. 15 are schematic diagrams of a timestamp sequence and Vsync-sf prediction according to an embodiment of this application.

FIG. 14 shows an example of a timestamp sequence and Vsync-sf prediction. When sampling is performed on Vsync-hw, sampling may be performed on a plurality of time points of the Vsync-hw, to obtain a plurality of timestamps, and Vsync-sf is generated by using the plurality of timestamps of the Vsync-hw. In FIG. 14, an example in which $(i+2)^{th}$ Vsync-sf is generated by using a plurality of timestamps of $i^{th}$ Vsync-hw, and that Vsync-sf is generated by using Vsync-hw is not limited in this embodiment. The plurality of timestamps of the Vsync-hw may be stored in the timestamp sequence as a timestamp set. In FIG. 14, an example in which one timestamp (for example, a first timestamp) in the plurality of timestamps of the Vsync-hw is stored in the timestamp sequence is used for description.

For example, in FIG. 14, a first timestamp TS1 of Vsync-hw (abbreviated as Vsync-hw2) in a second periodicity is stored in the timestamp sequence, where the timestamp of the Vsync-hw2 is for generating Vsync-sf4; a first timestamp TS2 of Vsync-hw3 is stored in the timestamp sequence, and Vsync-sf5 may be generated based on the timestamp of the Vsync-hw3; and a first timestamp TS3 of Vsync-hw4 is stored in the timestamp sequence, and Vsync-sf6 may be generated based on the timestamp of the Vsync-hw4. Because time consumption of the Vsync-hw3 is long, sampling time consumption of the Vsync-hw3 increases, causing the Vsync-sf5 to be generated after a delay. In addition, before the refresh rate is switched, a periodicity of the Vsync-hw should be the same as a periodicity of the Vsync-sf. However, the increased time consumption of the Vsync-hw3 makes periodicities of the Vsync-hw3 and the Vsync-sf3 different, resulting in end time of the Vsync-sf3 being different from end time of the Vsync-hw3, where the end of the Vsync-hw3 is later than the end of the Vsync-sf3. After the Vsync-sf3 ends, the Vsync-sf4 starts; and after the Vsync-hw3 ends, the Vsync-hw4 starts. In this case, when the end time of the Vsync-sf3 is different from the end time of the Vsync-hw3, starts of the Vsync-sf4 and the Vsync-hw4 are different, and software/hardware Vsync is not aligned starting from the Vsync-hw4.

Figure 15:
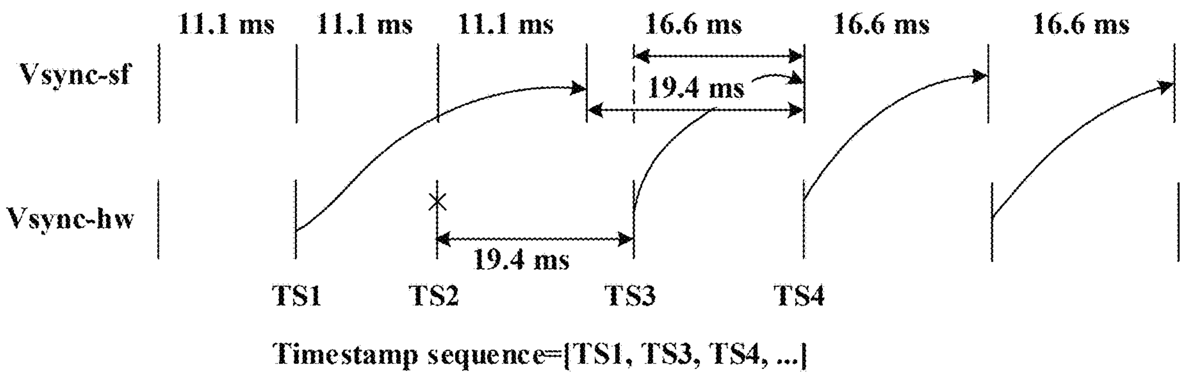

FIG. 15 shows optimization of the timestamp sequence and Vsync-sf prediction. If it is recognized that the refresh rate is switched, and the time consumption of the Vsync-hw3 before the refresh rate is switched is 19.4 ms, addHwVsyncTimestamp skips the timestamp of the Vsync-hw3 and generates the Vsync-sf5 by using the timestamp of the Vsync-hw4, where there is one periodicity of Vsync-hw between the Vsync-sf5 and the Vsync-hw3, and there is also one periodicity of Vsync-hw between the Vsync-hw5 and the Vsync-hw3. In this case, it indicates that there is one periodicity of Vsync-hw (that is, one Vsync-hw4) between start time of each of the Vsync-hw5 and the Vsync-sf5 and the end time of the Vsync-hw3, the Vsync-hw5 and the Vsync-sf5 correspond to a same refresh rate, and periodicities of the Vsync-hw5 and the Vsync-sf5 are the same. Therefore, the Vsync-hw5 and the Vsync-sf5 have the same periodicity, and also have same references, that is, the Vsync-hw5 and the Vsync-sf5 are aligned.

Because addHwVsyncTimestamp skips the timestamp of the Vsync-hw3 and generates the Vsync-sf5 by using the timestamp of the Vsync-hw4, the Vsync-hw4 is next Vsync-hw of the Vsync-hw3. In this case, generating the Vsync-sf5 by using the timestamp of the Vsync-hw4 means that generation of the Vsync-sf5 is delayed, and end time of the Vsync-sf4 is also delayed, making a periodicity of the Vsync-sf4 increase. For example, in FIG. 15, the periodicity of the Vsync-sf4 is 19.4 ms, a dashed line indicates that the Vsync-sf5 is generated by the Vsync-hw3, and the periodicity of the Vsync-sf4 increases from 16.6 ms to 19.4 ms when the Vsync-sf5 is generated by using the timestamp of the Vsync-hw4. Although the periodicity of the Vsync-sf4 increases, the Vsync-hw5 and the Vsync-sf5 are aligned. In this way, starting from the Vsync-sf5, the electronic device can normally generate an image frame, thereby avoiding synthesizing one frame and losing one frame.

In addition, this application provides an electronic device, where the electronic device includes: one or more processors; and one or more memories, where the memory stores one or more programs, and the one or more programs, when executed by the processor, enable the electronic device to perform the foregoing display method.

This application provides a computer-readable storage medium, where the computer-readable storage medium stores a computer program, and the computer program, when executed by a processor, enables the processor to perform the foregoing display method.

The invention claimed is:

1. A display method, applied to an electronic device, wherein the method comprises:

determining that a refresh rate of the electronic device is switched from a first refresh rate to a second refresh rate, wherein the first refresh rate is greater than the second refresh rate;

controlling, after the refresh rate is switched to the second refresh rate, a first signal to be aligned with a second signal, wherein the first signal indicates to generate an image frame, and the second signal indicates to display the image frame;

generating, in a case that the refresh rate is switched from the first refresh rate to the second refresh rate, a second image frame after the electronic device completes display of a first image frame;

displaying the second image frame;

generating a third image frame when the electronic device completes display of the second image frame and a level change of the first signal meets a preset condition, wherein the preset condition is that a level of the first signal changes from a low level to a high level, or the level of the first signal changes from the high level to the low level; and displaying the third image frame under action of the second signal.

2. The method according to claim 1, wherein before the determining that the refresh rate of the electronic device is switched from the first refresh rate to the second refresh rate, the method further comprises:

generating, in a case that the refresh rate is the first refresh rate, an $(i+n)^{th}$ first signal based on an $i^{th}$ second signal, wherein an interval between the $(i+n)^{th}$ first signal and the $i^{th}$ second signal is a sum of periodicities of n first signals, and n is a natural number greater than 1; and the controlling, after the refresh rate is switched to the second refresh rate, the first signal to be aligned with the second signal comprises:

sampling, after the refresh rate is switched to the second refresh rate, a $1^{st}$ second signal after the refresh rate is switched; and generating the first signal by using a sampling result of the $1^{st}$ second signal, wherein an interval between the first signal and the $1^{st}$ second signal is a sum of periodicities of (n−1) second signals.

3. The method according to claim 2, wherein the method further comprises: discarding a special signal, wherein the special signal is the second signal generated in a process in which the refresh rate is switched from the first refresh rate to the second refresh rate, and the special signal is a previous signal of the $1^{st}$ second signal.

4. The method according to claim 3, wherein the discarding the special signal comprises:

prohibiting sampling the special signal; or sampling the special signal, wherein a sampling result of the special signal is not stored in a result sequence.

5. The method according to claim 1, wherein the second image frame is an image frame lost in a process in which the refresh rate is switched from the first refresh rate to the second refresh rate.

6. The method according to claim 1, wherein that the electronic device completes display of the first image frame comprises:

determining that the electronic device completes display of the first image frame after the electronic device invokes a kernel thread crtc_commit to release a fence resource.

7. The method according to claim 1, wherein the determining that the refresh rate of the electronic device is switched from the first refresh rate to the second refresh rate comprises:

determining end time of the first signal and start time of the first signal when the refresh rate of the electronic device is the first refresh rate;

determining a difference between the end time and the start time; and determining that the refresh rate of the electronic device is switched from the first refresh rate to the second refresh rate if the difference meets a preset switching condition.

8. The method according to claim 1, wherein an application framework layer of the electronic device comprises a refresh rate processing unit and a data reading unit; a hardware abstraction layer of the electronic device comprises a hardware composer; and a kernel layer of the electronic device comprises a display driver, wherein the refresh rate processing unit is configured to determine that the refresh rate of the electronic device is switched from the first refresh rate to the second refresh rate;

the data reading unit is configured to read, in a case that the refresh rate is switched from the first refresh rate to the second refresh rate, first image data after the electronic device completes display of the first image frame;

the hardware composer is configured to synthesize the first image data, to generate the second image frame; and the display driver is configured to display the second image frame.

9. The method according to claim 8, wherein the application framework layer of the electronic device further comprises: a signal generation unit, wherein the signal generation unit is configured to control, after the refresh rate is switched to the second refresh rate, the first signal to be aligned with the second signal, wherein the first signal indicates to generate the image frame, and the second signal indicates to display the image frame;

the data reading unit is further configured to read second image data when the electronic device completes display of the second image frame and the level change of the first signal meets the preset condition, wherein the preset condition is that the level of the first signal changes from the low level to the high level, or the level of the first signal changes from the high level to the low level;

the hardware composer is further configured to synthesize the second image data, to generate the third image frame; and the display driver is further configured to display the third image frame under the action of the second signal.

10. An electronic device, wherein the electronic device comprises:

a memory configured to store a computer program; and a processor, wherein, when the computer program is executed by the processor, the electronic device is enabled to:

determine that a refresh rate of the electronic device is switched from a first refresh rate to a second refresh rate, wherein the first refresh rate is greater than the second refresh rate;

control, after the refresh rate is switched to the second refresh rate, a first signal to be aligned with a second signal, wherein the first signal indicates to generate an image frame, and the second signal indicates to display the image frame;

generate, in a case that the refresh rate is switched from the first refresh rate to the second refresh rate, a second image frame after the electronic device completes display of a first image frame;

display the second image frame;

generate a third image frame when the electronic device completes display of the second image frame and a level change of the first signal meets a preset condition, wherein the preset condition is that a level of the first signal changes from a low level to a high level, or the level of the first signal changes from the high level to the low level; and display the third image frame under action of the second signal.

11. The electronic device according to claim 10, wherein before the determining that the refresh rate of the electronic device is switched from the first refresh rate to the second refresh rate, the electronic device is further enabled to:

generate, in a case that the refresh rate is the first refresh rate, an $(i+n)^{th}$ first signal based on an $i^{th}$ second signal, wherein an interval between the $(i+n)^{th}$ first signal and the $i^{th}$ second signal is a sum of periodicities of n first signals, and n is a natural number greater than 1; and control, after the refresh rate is switched to the second refresh rate, a first signal to be aligned with a second signal comprises:

sampling, after the refresh rate is switched to the second refresh rate, a $1^{st}$ second signal after the refresh rate is switched, and generating the first signal by using a sampling result of the $1^{st}$ second signal, wherein an interval between the first signal and the $1^{st}$ second signal is a sum of periodicities of (n−1) second signals.

12. The electronic device according to claim 11, wherein the electronic device is further enabled to:

discard a special signal, wherein the special signal is the second signal generated in a process in which the refresh rate is switched from the first refresh rate to the second refresh rate, and the special signal is a previous signal of the 1st second signal.

13. The electronic device according to claim 12, wherein, to discard the special signal, the electronic device is further enabled to:

prohibit sampling the special signal; or sample the special signal, wherein a sampling result of the special signal is not stored in a result sequence.

14. The electronic device according to claim 10, wherein the second image frame is an image frame lost in a process in which the refresh rate is switched from the first refresh rate to the second refresh rate.

15. The electronic device according to claim 10, wherein that the electronic device completes display of the first image frame, the electronic device is further enabled to:

determine that the electronic device completes display of the first image frame after the electronic device invokes a kernel thread crtc_commit to release a fence resource.

16. The electronic device according to claim 10, wherein, to determine that the refresh rate of the electronic device is switched from the first refresh rate to the second refresh rate, the electronic device is further enabled to:

determine end time of the first signal and start time of the first signal when the refresh rate of the electronic device is the first refresh rate;

determine a difference between the end time and the start time; and determine that the refresh rate of the electronic device is switched from the first refresh rate to the second refresh rate if the difference meets a preset switching condition.

17. The electronic device according to claim 10, wherein an application framework layer of the electronic device comprises a refresh rate processing unit and a data reading unit; a hardware abstraction layer of the electronic device comprises a hardware composer; and a kernel layer of the electronic device comprises a display driver, wherein the refresh rate processing unit is configured to determine that the refresh rate of the electronic device is switched from the first refresh rate to the second refresh rate;

the data reading unit is configured to read, in a case that the refresh rate is switched from the first refresh rate to the second refresh rate, first image data after the electronic device completes display of the first image frame;

the hardware composer is configured to synthesize the first image data, to generate the second image frame; and the display driver is configured to display the second image frame.

18. The electronic device according to claim 17, wherein the application framework layer of the electronic device further comprises: a signal generation unit, wherein the signal generation unit is configured to control, after the refresh rate is switched to the second refresh rate, the first signal to be aligned with the second signal, wherein the first signal indicates to generate the image frame, and the second signal indicates to display the image frame;

the data reading unit is further configured to read second image data when the electronic device completes display of the second image frame and the level change of the first signal meets the preset condition, wherein the preset condition is that the level of the first signal changes from the low level to the high level, or the level of the first signal changes from the high level to the low level;

the hardware composer is further configured to synthesize the second image data, to generate the third image frame; and the display driver is further configured to display the third image frame under the action of the second signal.

19. A non-transitory computer-readable storage medium storing instructions, wherein the instructions, when executed by one or more processors, cause an electronic device to:

determine that a refresh rate of the electronic device is switched from a first refresh rate to a second refresh rate, wherein the first refresh rate is greater than the second refresh rate;

control, after the refresh rate is switched to the second refresh rate, a first signal to be aligned with a second signal, wherein the first signal indicates to generate an image frame, and the second signal indicates to display the image frame;

generate, in a case that the refresh rate is switched from the first refresh rate to the second refresh rate, a second image frame after the electronic device completes display of a first image frame;

display the second image frame;

generate a third image frame when the electronic device completes display of the second image frame and a level change of the first signal meets a preset condition, wherein the preset condition is that a level of the first signal changes from a low level to a high level, or the level of the first signal changes from the high level to the low level; and display the third image frame under action of the second signal.

* * * * *